(12) United States Patent
Leleannec et al.

(10) Patent No.: US 12,401,793 B2
(45) Date of Patent: Aug. 26, 2025

(54) ENCODING AND DECODING METHODS AND CORRESPONDING DEVICES

(71) Applicant: INTERDIGITAL MADISON PATENT HOLDINGS, SAS, Paris (FR)

(72) Inventors: Fabrice Leleannec, Mouazé (FR); Antoine Robert, Mézières sur Couesnon (FR); Tangi Poirier, Thorigné-Fouillard (FR)

(73) Assignee: INTERDIGITAL MADISON PATENT HOLDINGS, SAS, Paris (FR)

( * ) Notice: Subject to any disclaimer, the term of this patent is extended or adjusted under 35 U.S.C. 154(b) by 0 days.

(21) Appl. No.: 18/521,946

(22) Filed: Nov. 28, 2023

(65) Prior Publication Data

US 2024/0107017 A1    Mar. 28, 2024

Related U.S. Application Data

(63) Continuation of application No. 17/401,083, filed on Aug. 12, 2021, now Pat. No. 11,889,073, which is a
(Continued)

(30) Foreign Application Priority Data

Oct. 5, 2016   (EP) .................... 16306308

(51) Int. Cl.
*H04N 19/119* (2014.01)
*H04N 19/13* (2014.01)
(Continued)

(52) U.S. Cl.
CPC .......... *H04N 19/119* (2014.11); *H04N 19/13* (2014.11); *H04N 19/136* (2014.11); *H04N 19/176* (2014.11); *H04N 19/91* (2014.11)

(58) Field of Classification Search
CPC ...... H04N 19/119; H04N 19/13; H04N 19/91; H04N 19/176; H04N 19/136
(Continued)

(56) References Cited

U.S. PATENT DOCUMENTS 9,912,944 B2   3/2018  Guo
2012/0114043 A1  5/2012  Lee
(Continued)

FOREIGN PATENT DOCUMENTS

CN   102595116 A   7/2012
CN   102771124 A   11/2012
(Continued)

OTHER PUBLICATIONS

Yamazaki, I., et al., "On partitioning and reordering problems in a hierarchically parallel hybrid linear solver." In 2013 IEEE International Symposium on Parallel & Distributed Processing, Workshops and Phd Forum, pp. 1391-1400. IEEE, 2013 (10 pages).
(Continued)

*Primary Examiner* — Nam D Pham
(74) *Attorney, Agent, or Firm* — Klintworth & Rozenblat IP LLP

(57) ABSTRACT

A decoding method for decoding a block of an image is disclosed that comprises: determining a split mode for said block in a set of split modes; splitting said block into at least two sub-blocks responsive to said split mode; decoding each of the at least two sub-blocks; wherein said set of split modes comprises at least one split mode for asymmetrically splitting said block into the at least two sub-blocks.

9 Claims, 11 Drawing Sheets

Related U.S. Application Data continuation of application No. 16/339,716, filed as application No. PCT/EP2017/074224 on Sep. 25, 2017, now Pat. No. 11,228,759.

(51) Int. Cl.
*H04N 19/136* (2014.01)
*H04N 19/176* (2014.01)
*H04N 19/91* (2014.01)

(58) Field of Classification Search
USPC .................................................. 375/240.02
See application file for complete search history.

(56) References Cited

U.S. PATENT DOCUMENTS

| | | |
|---|---|---|
| 2013/0070848 A1 | 3/2013 | Guo |
| 2013/0107950 A1 | 5/2013 | Guo |
| 2013/0182758 A1 | 7/2013 | Seregin |
| 2013/0188704 A1 | 7/2013 | Zhou |
| 2013/0301707 A1 | 11/2013 | Lai |
| 2014/0226719 A1 | 8/2014 | Yamamoto |
| 2014/0294087 A1 | 10/2014 | Oh |
| 2016/0165209 A1 | 6/2016 | Huang |
| 2016/0219276 A1* | 7/2016 | Li ..................... H04N 19/119 |
| 2017/0347123 A1 | 11/2017 | Panusopone |

FOREIGN PATENT DOCUMENTS

| | | |
|---|---|---|
| CN | 103797802 A | 5/2014 |
| CN | 103931182 A | 7/2014 |
| CN | 104285447 A | 1/2015 |
| EP | 2763415 A1 | 8/2014 |
| JP | 2012186763 A | 9/2012 |
| JP | 2013085234 A | 5/2013 |
| JP | 2013118424 A | 6/2013 |
| KR | 20140071419 A | 6/2014 |
| KR | 20140074945 A | 6/2014 |
| KR | 20140120909 A | 10/2014 |
| WO | 2013040370 A1 | 3/2013 |
| WO | 2013047805 A1 | 4/2013 |
| WO | 2014120369 A1 | 8/2014 |
| WO | 2016090568 A1 | 6/2016 |
| WO | 2016091161 A1 | 6/2016 |
| WO | 2016123169 A1 | 8/2016 |

OTHER PUBLICATIONS

Chen, J., et al., "Algorithm Description of Joint Exploration Test Model 3" Joint Video Exploration Team (JVET) of ITU-T SG 16 WP 3 and ISO/IEC JTC 1/SC 29/WG 11, 3rd Meeting, Document No. JVET-C1001 v3 May-Jun. 2016, (37 pages).

Chen, Jianle, et. al., "Algorithm Description of Joint Exploration Test Model 4 (JEM4)", Joint Video Exploration Team (JVET) of ITU-T SG 16 WP 3 and 1S0/IEC JTC 1/SC 29/WG 11, 4th Meeting, Oct. 2016, pp. 1-39 (39 pages).

Suehring, K., et. al., "JVET Common Test Conditions and Software Reference Configurations". Joint Video Exploration Team (JVET), ITU-T SG16 WP3 and ISO/IEC JTC1/SC29/WG11, Doc. JVET-B1010, Feb. 2016 (4 pages).

Leleannec, F. et al., "Asymmetric Coding Units in QTBT" Joint Video Exploration Team (JVET) of ITU-T SG 16 WP 3 and ISO/IEC JTC 1/SC 29/WG 11, 4th meeting: Chengdu, CN, Doc: JVET-D0064, Oct. 2016 (10 pages).

Kim, I.K. et al., "CE2: Test results of asymmetric motion partition (AMP)." Joint Collaborative Team on Video Coding (JCT-VC) of ITU-T SG16 WP3 and ISO/IEC JTC1/SC 29/WG11, 6th meeting Doc: JCTVC-F379, Jul. 2011 (8 pages).

Kim, I. K. et al., "Simulation results of motion partition, block merging and motion competition schemes" Joint Collaborative Team on Video Coding (JCT-VC) of ITU-T SG16 WP3 and ISO/IEC JTC1/SC 29/WG11, 3rd Meeting: Guangzhou, CN, Oct. 2010 (4 pages).

International Telecommunication Union, "High Efficiency Video Coding". Series H: Audiovisual and Multimedia Systems; Infrastructure of Audiovisual Services—Coding of Moving Video, Recommendation ITU-T H.265, Telecommunication Standardization Sector of ITU, Apr. 2015, 636 pages.

An et al., "Quadtree plus binary tree structure integration with JEM tools", Joint Video Exploration Team of ITU-T SG 16 WP 3 and ISO/IEC JTC 1/SC 29/WG 11, Document JVET-B0023, San Diego, California, USA, Feb. 20, 2016, pp. 1-6 (6 pages).

Huang, H. et al., "EE2.1: Quadtree plus binary tree structure integration with JEM tools", Joint Video Exploration Team of ITU-T SG 16 WP 3 and ISO/IEC JTC 1/SC 29/WG 11, Document: JVET-C0024, Geneva, CH, May 26-Jun. 1, 2016 (5 pages).

* cited by examiner

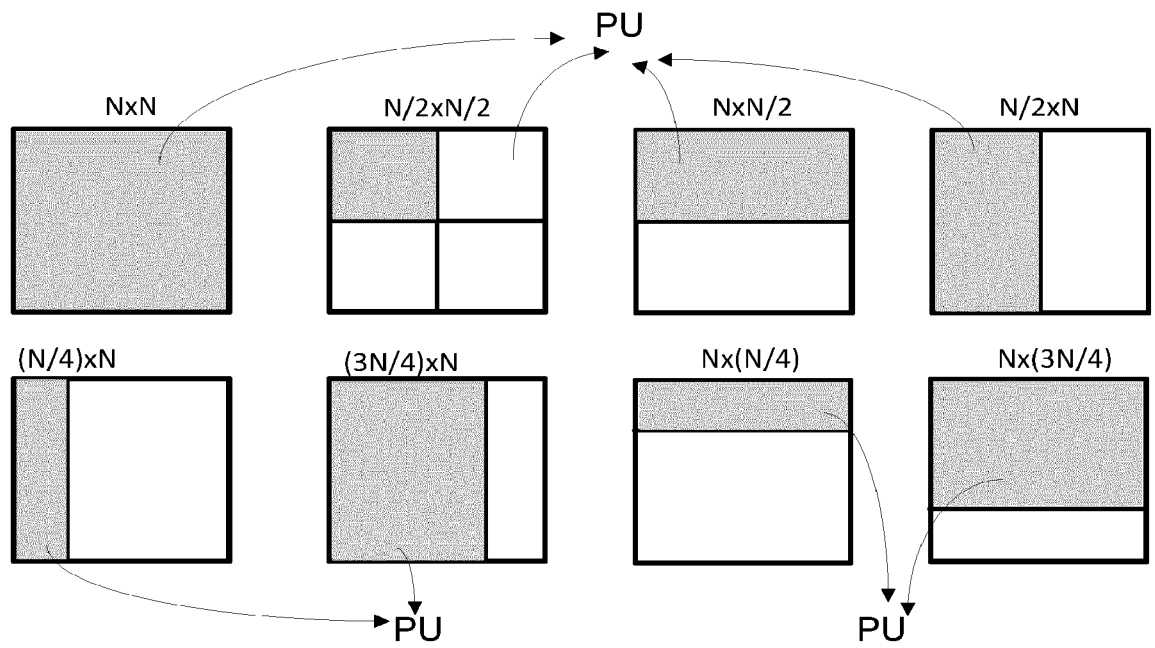
Splitting of a Coding Unit (CU) into Prediction Units (PU)
Figure 1 – Prior Art
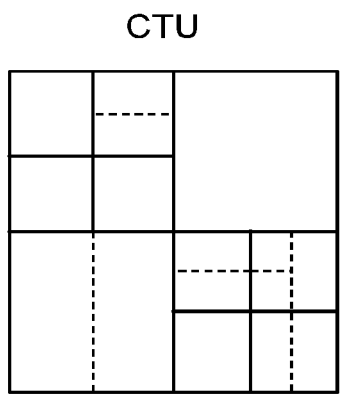
Figure 2 – Prior Art

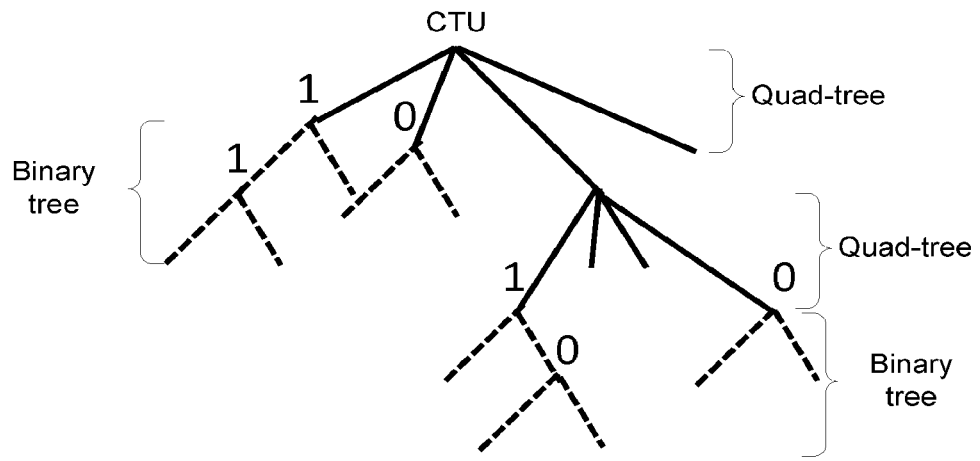
Figure 3 – Prior Art
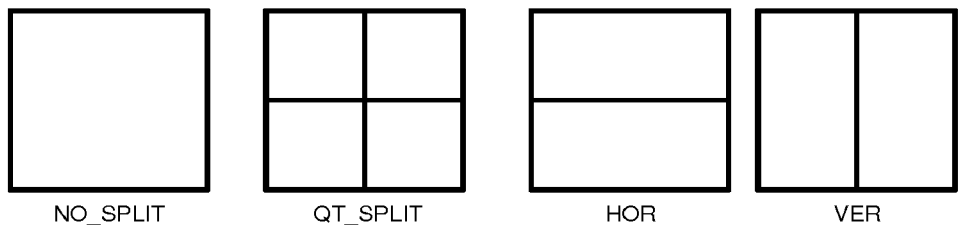
Figure 4 – Prior Art
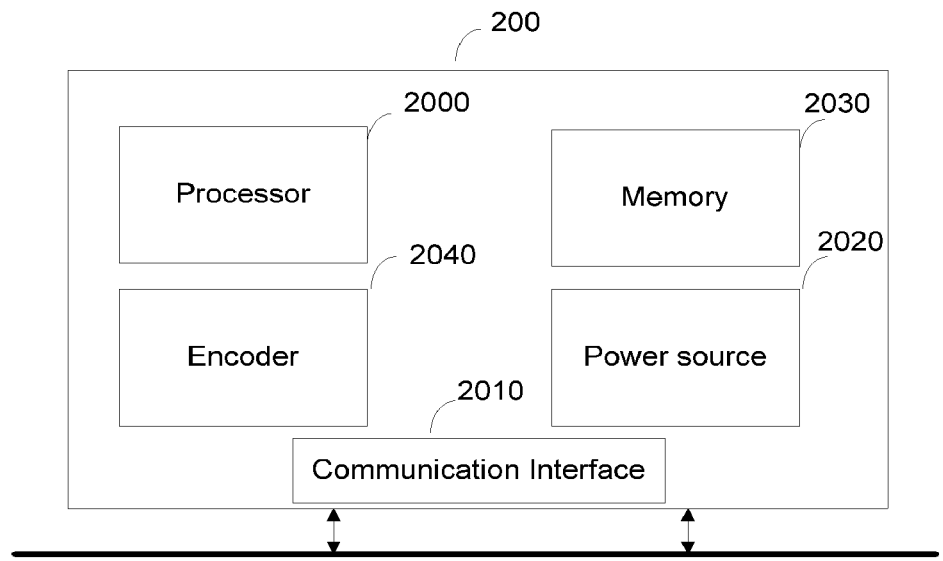
FIGURE 5

ENCODING AND DECODING METHODS AND CORRESPONDING DEVICES

CROSS-REFERENCE TO RELATED APPLICATIONS

The present application is a continuation of U.S. patent application Ser. No. 17/401,083, entitled "ENCODING AND DECODING METHODS AND CORRESPONDING DEVICES" and filed Aug. 12, 2021, which is incorporated herein by reference in its entirety, and which is a continuation of U.S. patent application Ser. No. 16/339,716, titled "ENCODING AND DECODING METHODS AND CORRESPONDING DEVICES" and filed Apr. 4, 2019, which is incorporated herein by reference in its entirety, and which claims the benefit, under 35 U.S.C. § 371 of International Application PCT/EP2017/074224, titled "ENCODING AND DECODING METHODS AND CORRESPONDING DEVICES" and filed Sep. 25, 2017, which was published in accordance with PCT Article 21 (2) on Apr. 12, 2018, in English, and which claims the benefit of European Patent Application No. 16306308.4, filed Oct. 5, 2016.

1. TECHNICAL FIELD

In the following, a method and a device for encoding a picture are disclosed. Corresponding decoding method and decoding device are further disclosed.

2. BACKGROUND ART

To achieve high compression efficiency, video coding schemes usually employ prediction and transform to leverage spatial and temporal redundancy in the video content. Generally, intra or inter prediction is used to exploit the intra or inter frame correlation, then the differences between the original image and the predicted image, often denoted as residuals, are transformed, quantized and entropy coded. To reconstruct the video, the compressed data is decoded by inverse processes corresponding to the prediction, transform, quantization and entropy coding.

In HEVC coding ("ITU-T H.265 Telecommunication standardization sector of ITU (10/2014), series H: audiovisual and multimedia systems, infrastructure of audiovisual services—coding of moving video, High efficiency video coding, Recommendation ITU-T H.265"), a picture is partitioned into coding tree units (CTU) of square shape with a configurable size typically 64×64, 128×128, or 256×256. A CTU is the root of a quad-tree partitioning into Coding Units (CU). For each CU, a prediction mode is signaled which indicates whether the CU is coded using intra or inter prediction. A Coding Unit is partitioned into one or more Prediction Units (PU) and forms the root of a quad-tree (known as transform tree) partitioning into Transform Units (TUs). A PU may have a square or a rectangular shape while a TU has a square shape. Asymmetric subdivision of the CU into PUs is also possible in inter prediction, that is if a CU has a size N×N, a PU may have a size N/4×N, 3N/4×M, N×N/4, N×3N/4 as illustrated on FIG. 1. Each PU is assigned some prediction information, for instance motion information, spatial intra prediction, etc.

Quad-Tree plus Binary-Tree (QTBT) coding tool ("Algorithm Description of Joint Exploration Test Model 3", Document JVET-C1001_v3, Joint Video Exploration Team of ISO/IEC JTC1/SC29/WG11, 3rd meeting, 26 May-1 Jun. 2015, Geneva, CH) is a new video coding tool that provides a more flexible CTU representation than the CU/PU/TU arrangement of the HEVC standard. The Quad-Tree plus Binary-Tree (QTBT) coding tool defines a coding tree where coding units can be split both in a quad-tree and in a binary-tree fashion. Such coding tree representation of a Coding Tree Unit is illustrated on FIG. 2, where solid lines indicate quad-tree partitioning and dotted lines indicate binary partitioning of a CU.

The splitting of a CTU into coding units is decided on the encoder side, e.g. through a rate distortion optimization procedure which consists in determining the QTBT representation of the CTU with minimal rate distortion cost. In the QTBT representation, a CU has either a square or a rectangular shape. The size of a coding unit is always a power of 2, and typically goes from 4 to 128. The QTBT decomposition of a CTU comprises two stages: the CTU is first split into 4 CUs in a quad-tree fashion, then each quad-tree leaf can be further divided into two CUs in a binary fashion or into 4 CUs in a quad-tree fashion, as illustrated on FIG. 3. On FIG. 3, solid lines represent the quad-tree splitting and dotted lines represent the binary splitting that is spatially embedded in the quad-tree leaves.

With the QTBT representation, a CU is not further partitioned into PUs or TUs. In other words, once the partitioning of a CTU is decided, each CU is considered as a single prediction unit and a single transform unit. However, such a QTBT representation only allows for symmetric splitting of a CU as illustrated by FIG. 4. FIG. 4 depicts 4 split modes allowed by QTBT. The mode NO_SPLIT indicates that the CU is not further split, the mode QT_SPLIT indicates that the CU is split into 4 quadrants according to a quad-tree, the mode HOR indicates that the CU is split horizontally into two CUs of equal size and VER indicates that the CU is split vertically into two CUs of equal size.

3. BRIEF SUMMARY

A decoding method for decoding a block of an image comprising:
  determining a split mode for the block in a set of split modes;
  splitting the block into at least two sub-blocks responsive to the split mode;
  decoding each of the at least two sub-blocks;
  wherein the set of split modes comprises at least one split mode for asymmetrically splitting the block into the at least two sub-blocks.

A decoding device configured to decode a block of an image is disclosed that comprises:
  means for determining a split mode for the block in a set of split modes;
  means for splitting the block into at least two sub-blocks responsive to the split mode;
  means for decoding each of the at least two sub-blocks;
  wherein the set of split modes comprises at least one split mode for asymmetrically splitting the block into the at least two sub-blocks.

A decoding device comprising a communication interface configured to access at least a stream and at least one processor is disclosed, wherein the at least one processor is configured to:
  determine a split mode for a block of an image in a set of split modes;
  splitting the block into at least two sub-blocks responsive to the split mode;
  decoding each of the at least two sub-blocks from the accessed stream;

wherein the set of split modes comprises at least one split mode for asymmetrically splitting the block into the at least two sub-blocks.

The following embodiments apply to the decoding method and decoding devices disclosed above.

Advantageously, determining the split mode comprises:
decoding a first syntax element (btSplitOrientation) specifying whether the block is split vertically or horizontally;
decoding a second syntax element (horAsymmetricSplitFlag, verAsymmetricSplitFlag) specifying whether the block is split symmetrically or asymmetrically; and
decoding a split mode syntax element (vertical/horizontal_asymmetric_type) in the case where the second syntax element specifies that the block is split asymmetrically.

According to a specific characteristic, the second syntax element, i.e. either horAsymmetricSplitFlag or verAsymmetricSplitFlag, is decoded from a single bit.

In a variant, the second syntax element (either horAsymmetricSplitFlag or verAsymmetricSplitFlag) is decoded by context-based arithmetic coding using a single context which depend on the values taken by the second syntax element when decoding blocks preceding the current block in decoding order.

In a variant, the second syntax element horAsymmetricSplitFlag is decoded by context-based arithmetic coding using two contexts which depend on the number of sub-blocks located in a left neighboring block that have a height lower than or equal to a quarter of the current block height. In the same way, the second syntax element verAsymmetricSplitFlag is decoded by context-based arithmetic coding using two contexts which depend on the number of sub-blocks located in a top neighboring block that have a width lower than or equal to a quarter of the current block width.

According to a further embodiment the contexts proposed in one of the preceding embodiments are indexed either as a function of the quad-tree plus binary tree depth value associated with the current block or as a function of the block's width and height.

According to a specific characteristic, the split mode syntax element (vertical_asymmetric_type/horizontal_asymmetric_type), is decoded from a single bit.

In a variant, the split mode syntax element (either vertical_asymmetric_type or horizontal_asymmetric_type) is decoded by context-based arithmetic coding using a single context which depend on the values taken by the split mode syntax element when decoding blocks preceding the current block in decoding order.

In a variant, the split mode syntax element horizontal_asymmetric_type is decoded by context-based arithmetic coding using three contexts which depend on the existence in a block located on the left of the current block of a frontier that spatially coincides with an horizontal frontier in the current block obtained through the choice of a horizontal asymmetric splitting for the current block.

In the same way, the split mode syntax element vertical_asymmetric_type is decoded by context-based arithmetic coding using three contexts which depend on the existence in a block located above the current block of a frontier that spatially coincides with a vertical frontier in the current block obtained through the choice of a vertical asymmetric splitting for the current block.

According to a further embodiment the contexts proposed in one of the preceding embodiments are indexed either as a function of a quad-tree plus binary tree depth value associated with the current block or as a function of the block's width and height.

In a variant, determining the split mode comprises:
decoding a syntax element (merge_with_next_CU_flag) indicating that the block is merged with a next block in decoding order.

In a specific embodiment, the block is one of a block of luma samples, a block of chroma samples or a coding unit formed by of a block of luma samples and two blocks of chroma samples.

In a specific embodiment, splitting the block into at least two sub-blocks responsive to the split mode comprises splitting the block horizontally into one sub-block of height h/4 and one sub-block of height 3 h/4, where h is the height of the block.

In a specific embodiment, splitting the block into at least two sub-blocks responsive to the split mode comprises splitting the block vertically into one sub-block of width w/4 and one sub-block of width 3 w/4, where w is the width of the block.

A coding method for encoding a block of an image is also disclosed that comprises:
determining a split mode for the block in a set of split modes;
splitting the block into at least two sub-blocks responsive to the split mode;
encoding each of the at least two sub-blocks;
wherein the set of split modes comprises at least one split mode for asymmetrically splitting the block into the at least two sub-blocks.

A coding device configured to encode a block of an image is also disclosed that comprises:
means for determining a split mode for the block in a set of split modes;
means for splitting the block into at least two sub-blocks responsive to the split mode;
means for encoding each of the at least two sub-blocks;
wherein the set of split modes comprises at least one split mode for asymmetrically splitting the block into the at least two sub-blocks.

A coding device comprising a communication interface configured to access at least a block of an image, named the current block, and at least one processor is disclosed. The at least one processor is configured to:
determine a split mode for the block in a set of split modes;
split the block into at least two sub-blocks responsive to the split mode;
encode each of the at least two sub-blocks;
wherein the set of split modes comprises at least one split mode for asymmetrically splitting the block into the at least two sub-blocks.

The following embodiments apply to the coding method and coding devices disclosed above.

Advantageously, determining the split mode comprises:
determining and encoding a first syntax element (btSplitOrientation) specifying whether the block is split vertically or horizontally;
determining and encoding a second syntax element (horAsymmetricSplitFlag, verAsymmetricSplitFlag) specifying whether the block is split symmetrically or asymmetrically; and
determining and encoding a split mode syntax element (vertical_asymmetric_type/horizontal_asymmetric_type) in the case where the second syntax element specifies that the block is split asymmetrically.

According to a specific characteristic, the second syntax element, i.e. either horAsymmetricSplitFlag or verAsymmetricSplitFlag, is encoded with a single bit.

In a variant, the second syntax element is encoded by context-based arithmetic coding using a single context which depends on the values taken by the second syntax element when encoding blocks preceding the current block in encoding order.

In a variant, the second syntax element horAsymmetricSplitFlag is encoded by context-based arithmetic coding using two contexts which depend on the number of sub-blocks located in a left neighboring block that have a height lower than or equal to a quarter of the current block height. In the same way, the second syntax element verAsymmetricSplitFlag is encoded by context-based arithmetic coding using two contexts which depend on the number of sub-blocks located in a top neighboring block that have a width lower than or equal to a quarter of the current block width.

According to a further embodiment the contexts proposed in one of the preceding embodiments are indexed either as a function of the quad-tree plus binary tree depth value associated with the current block or as a function of the block's width and height.

According to a specific characteristic, the split mode syntax element (vertical_asymmetric_type/horizontal_asymmetric_type), is encoded with a single bit.

In a variant, the split mode syntax element is encoded by context-based arithmetic coding using a single context which depends on the values taken by the split mode syntax element when encoding blocks preceding the current block in encoding order.

In a variant, the split mode syntax element horizontal_asymmetric_type is encoded by context-based arithmetic coding using three contexts which depend on the existence in a block located on the left of the current block of a frontier that spatially coincides with an horizontal frontier in the current block obtained through the choice of a horizontal asymmetric splitting for the current block.

In the same way, the split mode syntax element vertical_asymmetric_type is encoded by context-based arithmetic coding using three contexts which depend on the existence in a block located above the current block of a frontier that spatially coincides with a vertical frontier in the current block obtained through the choice of a vertical asymmetric splitting for the current block.

According to a further embodiment the contexts proposed in one of the preceding embodiments are indexed either as a function of a quad-tree plus binary tree depth value associated with the current block or as a function of the block's width and height.

In another embodiment, determining the split mode comprises:
  determining and encoding a syntax element (merge_with_next_CU_flag) indicating that the block is merged with a next block in encoding order.

As an exemplary embodiment, the block is one of a block of luma samples, a block of chroma samples or a coding unit formed by of a block of luma samples and two blocks of chroma samples.

In an embodiment, splitting the block into at least two sub-blocks responsive to the split mode comprises splitting the block horizontally into one sub-block of height h/4 and one sub-block of height 3 h/4, where his the height of the block.

In an embodiment, splitting the block into at least two sub-blocks responsive to the split mode comprises splitting the block vertically into one sub-block of width w/4 and one sub-block of width 3 w/4, where w is the width of the block.

A stream is also disclosed that comprises coded data representative of a block wherein the coded data are obtained by determining a split mode for the block in a set of split modes, splitting the block into at least two sub-blocks responsive to the split mode; encoding each of the at least two sub-blocks into the coded data wherein the set of split modes comprises at least one split mode for asymmetrically splitting the block into the at least two sub-blocks.

A non-transitory processor readable medium having stored thereon a stream is disclosed, wherein the stream comprises coded data representative of a block wherein the coded data are obtained by determining a split mode for the block in a set of split modes, splitting the block into at least two sub-blocks responsive to the split mode; encoding each of the at least two sub-blocks into the coded data wherein the set of split modes comprises at least one split mode for asymmetrically splitting the block into the at least two sub-blocks.

A transmitting method is disclosed that comprises transmitting coded data representative of a block wherein the coded data are obtained by determining a split mode for the block in a set of split modes, splitting the block into at least two sub-blocks responsive to the split mode; encoding each of the at least two sub-blocks into the coded data wherein the set of split modes comprises at least one split mode for asymmetrically splitting the block into the at least two sub-blocks.

Advantageously, the coded data comprises:
  a first syntax element (btSplitOrientation) specifying whether the block is split vertically or horizontally;
  a second syntax element (horAsymmetricSplitFlag, verAsymmetricSplitFlag) specifying whether the block is split symmetrically or asymmetrically; and
  a split mode syntax element (vertical/horizontal_asymmetric_type) in the case where the second syntax element specifies that the block is split asymmetrically.

In a variant, the coded data comprises a syntax element (merge_with_next_CU_flag) indicating that the block is merged with a next block in encoding order.

4. BRIEF SUMMARY OF THE DRAWINGS

FIG. 1 illustrates the asymmetric subdivision of a coding unit into prediction units according to the prior art;

FIGS. 2 and 3 illustrate the splitting of a coding tree unit into coding unit according to the state of the art;

FIG. 4 illustrates the splitting modes of a coding unit as defined by the Quad-Tree plus Binary-Tree coding tool;

FIG. 5 represents an exemplary architecture of a transmitter configured to encode an image block in a bitstream according to a non-limiting embodiment;

5. DETAILED DESCRIPTION

Figure 6:
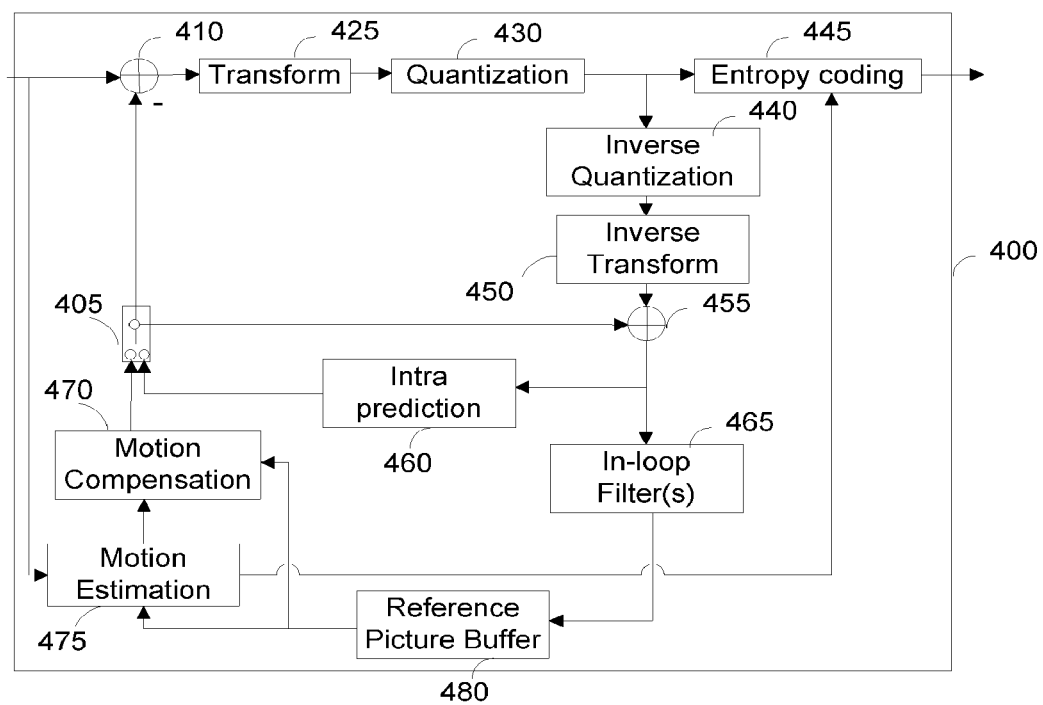
FIG. 6 illustrates an exemplary video encoder adapted to execute the encoding method of FIGS. 7 and/or 11.

It is to be understood that the figures and descriptions have been simplified to illustrate elements that are relevant for a clear understanding of the present principles, while eliminating, for purposes of clarity, many other elements found in typical encoding and/or decoding devices. It will be understood that, although the terms first and second may be used herein to describe various elements, these elements should not be limited by these terms. These terms are only used to distinguish one element from another. Various methods are described above, and each of the methods comprises one or more steps or actions for achieving the described method. Unless a specific order of steps or actions is required for proper operation of the method, the order and/or use of specific steps and/or actions may be modified or combined.

A picture is an array of luma samples in monochrome format or an array of luma samples and two corresponding arrays of chroma samples in 4:2:0, 4:2:2, and 4:4:4 colour format. Generally, a "block" addresses a specific area in a sample array (e.g., luma Y), and a "unit" includes the collocated block of all encoded color components (luma Y and possibly chroma Cb and chroma Cr). However, the term "block" is used herein to refer to a block (e.g. a CB) or a unit (e.g. a CU).

In the following sections, the word "reconstructed" and "decoded" can be used interchangeably. Usually but not necessarily "reconstructed" is used on the encoder side while "decoded" is used on the decoder side.

Encoding Apparatus

FIG. 5 represents an exemplary architecture of a transmitter 200 configured to encode an image block in a bitstream according to a non-limiting embodiment.

The transmitter 200 comprises one or more processor(s) 2000, which could comprise, for example, a CPU, a GPU and/or a DSP (English acronym of Digital Signal Processor), along with internal memory 2030 (e.g. RAM, ROM, and/or EPROM). The transmitter 200 comprises one or more communication interface(s) 2010 (e.g. a keyboard, a mouse, a touchpad, a webcam), each adapted to display output information and/or allow a user to enter commands and/or data (e.g. a stream); and a power source 2020 which may be external to the transmitter 200. The transmitter 200 may also comprise one or more network interface(s) (not shown). Encoder module 2040 represents the module that may be included in a device to perform the coding functions. Additionally, encoder module 2040 may be implemented as a separate element of the transmitter 200 or may be incorporated within processor(s) 2000 as a combination of hardware and software as known to those skilled in the art.

The image block may be obtained from a source. According to different embodiments, the source can be, but is not limited to:
- a local memory, e.g. a video memory, a RAM, a flash memory, a hard disk;
- a storage interface, e.g. an interface with a mass storage, a ROM, an optical disc or a magnetic support;
- a communication interface, e.g. a wireline interface (for example a bus interface, a wide area network interface, a local area network interface) or a wireless interface (such as a IEEE 802.11 interface or a Bluetooth interface); and
- an image capturing circuit (e.g. a sensor such as, for example, a CCD (or Charge-Coupled Device) or CMOS (or Complementary Metal-Oxide-Semiconductor)).

According to different embodiments, the bitstream may be sent to a destination. As an example, the bitstream is stored in a remote or in a local memory, e.g. a video memory or a RAM, a hard disk. In a variant, the bitstream is sent to a storage interface, e.g. an interface with a mass storage, a ROM, a flash memory, an optical disc or a magnetic support and/or transmitted over a communication interface, e.g. an interface to a point to point link, a communication bus, a point to multipoint link or a broadcast network.

According to an exemplary and non-limiting embodiment, the transmitter 200 further comprises a computer program stored in the memory 2030. The computer program comprises instructions which, when executed by the transmitter 200, in particular by the processor 2000, enable the transmitter 200 to execute the encoding method described with reference to FIGS. 7 and/or 11. According to a variant, the computer program is stored externally to the transmitter 200 on a non-transitory digital data support, e.g. on an external storage medium such as a HDD, CD-ROM, DVD, a read-only and/or DVD drive and/or a DVD Read/Write drive, all known in the art. The transmitter 200 thus comprises a mechanism to read the computer program. Further, the transmitter 200 could access one or more Universal Serial Bus (USB)-type storage devices (e.g., "memory sticks.") through corresponding USB ports (not shown).

According to exemplary and non-limiting embodiments, the transmitter 200 can be, but is not limited to:
- a mobile device;
- a communication device;
- a game device;
- a tablet (or tablet computer);
- a laptop;
- a still image camera;
- a video camera;
- an encoding chip or encoding device/apparatus;
- a still image server; and
- a video server (e.g. a broadcast server, a video-on-demand server or a web server).

Figure 7:
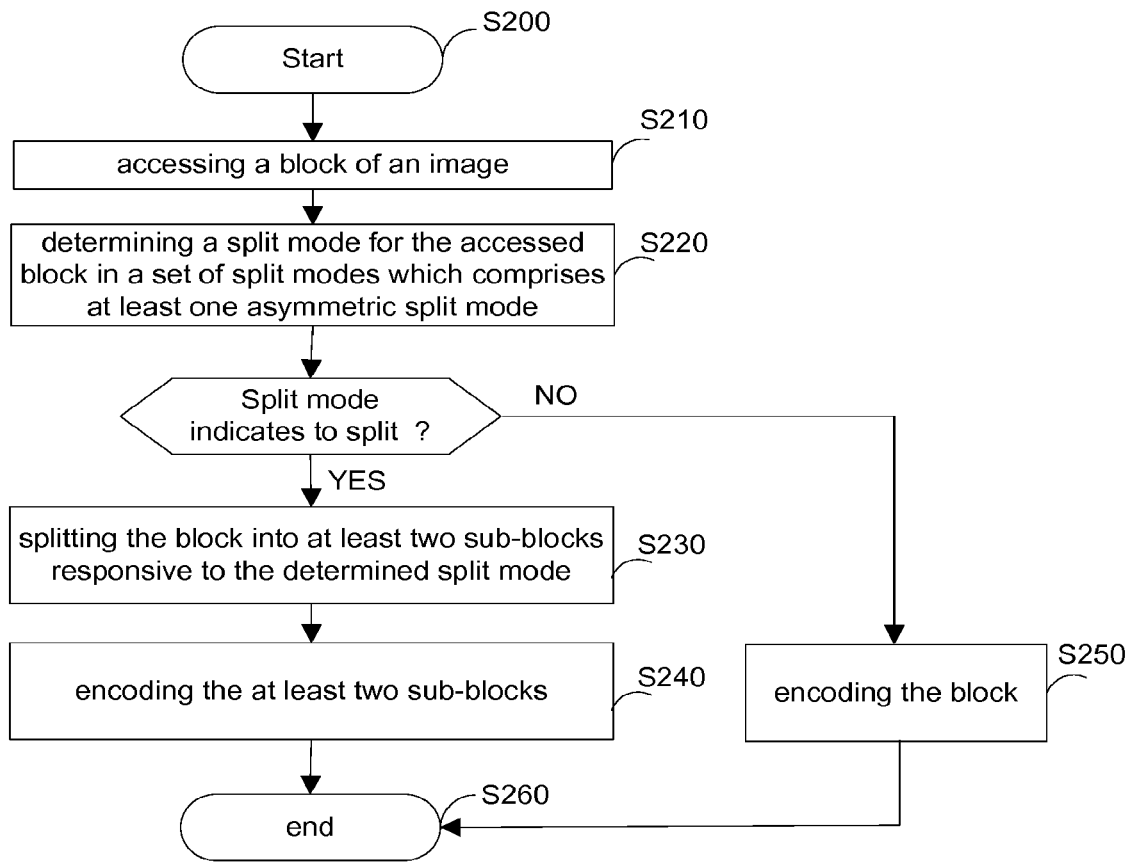
FIG. 7 represents a flowchart of a method for encoding a block of an image in a bitstream according to a specific and non-limiting embodiment.

FIG. 6 illustrates an exemplary video encoder 400 adapted to execute the encoding method of FIGS. 7 and/or 11. The encoder 400 is an example of a transmitter 200 or may be part of such a transmitter 200. To encode a video sequence with one or more pictures, a picture may be partitioned into coding tree units (CTU) of square shape with a configurable size. A consecutive set of coding tree units may be grouped into a slice. A CTU is the root of a QTBT partitioning into Coding Units. In the exemplary encoder 400, a picture is encoded by the encoder modules as described below. Each block is encoded using either an intra or inter mode. When a block is encoded in an intra mode, the encoder 400 performs intra prediction (module 460). In an inter mode, motion estimation (module 475) and compensation (module 470) are performed. The encoder decides (module 405) which one of the intra mode or inter mode to use for encoding the block, and indicates the intra/inter decision by a prediction mode flag. Residuals are calculated by subtracting (module 410) a predicted sample block (also known as a predictor) from the original image block.

As an example, blocks in intra mode are predicted from reconstructed neighboring samples. Inter prediction is performed by motion-compensating a reference block stored in a reference picture buffer 480.

The residuals are transformed (module 425) and quantized (module 430). The quantized transform coefficients, as well as motion vectors and other syntax elements, are entropy coded (module 445) to output a bitstream. The encoder may also skip the transform and apply quantization directly to the non-transformed residual signal. The encoder may also bypass both transform and quantization, i.e., the residual is coded directly without the application of the transform or quantization process. In direct PCM coding, no prediction is applied and the block samples are directly coded into the bitstream.

The encoder comprises a decoding loop and thus decodes an encoded block to provide a reference for further predictions. The quantized transform coefficients are de-quantized (module 440) and inverse transformed (module 450) to decode residuals. An image block is reconstructed by combining (module 455) the decoded residuals and the predicted sample block. An in-loop filter (465) may be applied to the reconstructed picture, for example, to perform deblocking/SAO (Sample Adaptive Offset) filtering to reduce coding artifacts. The filtered image is stored in the reference picture buffer 480.

Encoding Methods

FIG. 7 represents a flowchart of a method for encoding a block of an image in a bitstream according to a specific and non-limiting embodiment.

Figure 8:
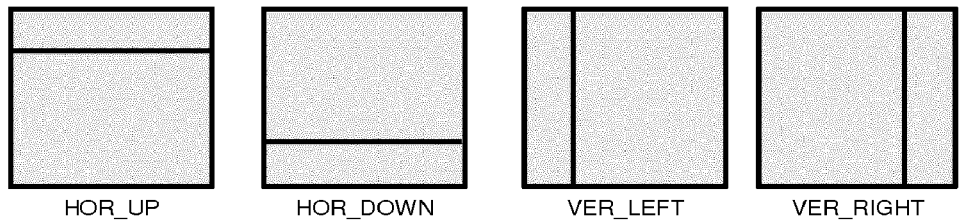
FIG. 8 depicts examples of asymmetric split modes according to the present principles.

The method starts at step S200. At step S210, a transmitter, e.g. such as the encoder 400, accesses a block of an image. The block is of size w×h, where w is its width (in pixel unit) and his its height (in pixel unit). The block is one of a coding block of luma samples, a coding block of chroma samples or a coding unit formed by of a coding block of luma samples and two coding blocks of chroma samples. At step S220, the transmitter determines a split mode for the accessed block in a set of split modes. In a specific embodiment, the determined split mode is the one in the set of split modes that provides the minimal rate-distortion cost. According to the present principles, the set of split modes comprises at least one asymmetric split mode. FIG. 8 depicts examples of such asymmetric split modes. In a first embodiment, the at least one asymmetric split mode indicates to split the block horizontally into one sub-block of height h/4 and one sub-block of height 3 h/4. The sub-block of height h/4 is either above (mode HOR_UP) or below (mode HOR_DOWN) the sub-block of height 3 h/4. In another embodiment, the at least one asymmetric split mode indicates to split the block vertically into one sub-block of width w/4 and one sub-block of width 3 w/4. The sub-block of width w/4 is either on the left (mode VER_LEFT) or right (mode VER_RIGHT) of the sub-block of width 3 w/4. In a specific embodiment, the set of split modes comprises all the split modes depicted on FIG. 8. In a variant embodiment, the at least one asymmetric split mode indicates to split the block either horizontally or vertically into sub-blocks whose size is not a power of two, e.g. their size in width w or height his equal to $3.2^n$ pixels with n being an integer.

In a variant, the set of split modes comprises in addition to the at least one asymmetric split mode, the split mode defined by QTBT and depicted on FIG. 4. In the case where the split mode indicates that the block is not further split (e.g. split mode=NO_SPLIT), then the block is encoded at step S250.

Otherwise, at step S230, the transmitter splits the accessed block into at least two sub-blocks responsive to the determined split mode.

At step S240, the transmitter encodes the at least two sub-blocks in a bitstream. Encoding the at least two sub-blocks may comprise recursively applying the steps S220 to S250 on each of the at least two sub-blocks. The recursive splitting ends when the block is not further split, e.g. because the split mode NO_SPLIT is determined at step S220. In this case, the block is encoded at step S250 by applying the following steps:

applying a same prediction on samples of said block to obtain a predicted block;

determining a residual block from said predicted block and said block;

applying a same transform on samples of said residual block to obtain a transformed block;

encoding, e.g. quantizing and entropy coding, said transformed block in a bitstream.

Splitting information indicating how the block is split is also encoded in the bitstream.

The method ends at step S260.

Advantageously, a coding unit with width or height equal to $3·2^n$ may be selected by the encoder according to the present principles. In such case, Intra prediction and/or Inter prediction of rectangular blocks with size multiple of 3 may be performed. Additionally, a 2D transform with size $3·2^n$ in width or height, and the subsequent transform coefficient entropy coding process may also be performed.

Figure 9:
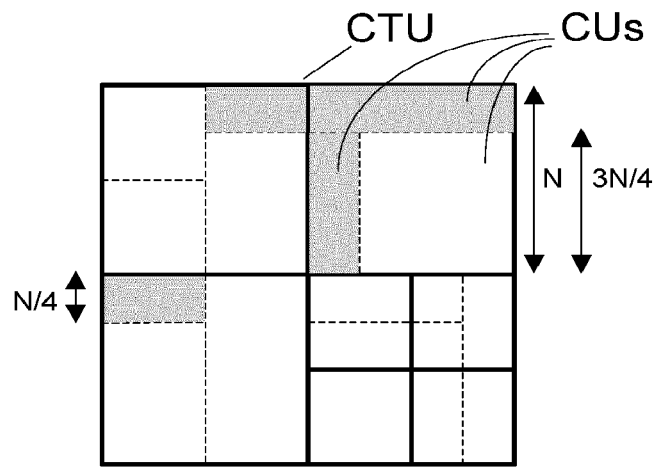
FIG. 9 depicts an example of a partitioning of a CTU into CUs according to the present principles.

These additional coding unit topologies help in having coding structures that spatially match the structures and discontinuities contained in the original signal. An example of a partitioning of a CTU into CUs according to the present principles is represented on FIG. 9. On this figure, quad-tree partitioning is represented by solid lines and binary partitioning (symmetric and asymmetric) is represented by dashed lines. Such partitioning (especially the grey CUs) cannot be obtained with partitioning as defined in HEVC or in QTBT. Adding asymmetric split mode in the case of binary splitting improves the coding efficiency by better matching the structures and discontinuities contained in the original signal.

Figure 10:
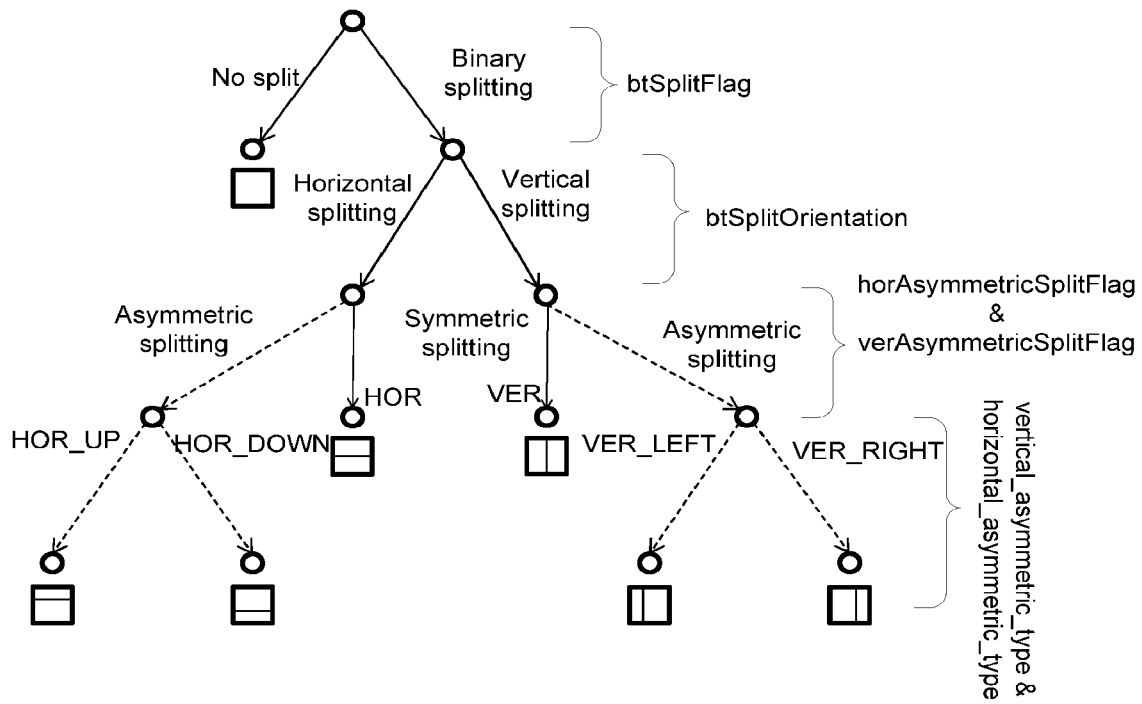
FIG. 10 is a graphic representation of an encoding syntax.

An exemplary syntax is defined in tables 1 and 2 to encode the binary splitting information in the bitstream. The syntax defines how the various items of information are coded. The syntax elements btSplitFlag and btSplitOrientation used to encode the binary split modes defined in QTBT are left unchanged. The first syntax element btSplitFlag indicates if the block (CU or CB) is split, and if so, the second syntax element btSplitOrientation indicates if the block is split horizontally or vertically. The QTBT syntax is modified by adding new syntax elements to indicate the new splitting modes of FIG. 8. Tables 1 and 2 are examples of syntax according to the present principles, and the amendments to the QTBT syntax are shown in italics. FIG. 10 is a graphic representation of the syntax as defined in tables 1 and 2. The added syntax elements are indicated by dashed lines on FIG. 10. The syntax elements from the QTBT are indicated by solid lines on FIG. 10.

The new syntax elements indicates if the binary split is asymmetric, and if so, which asymmetric binary split mode is used. More precisely, the horAsysmmetricFlag and verAsysmmetricFlag syntax elements indicate, for a block which is binary split, if the splitting mode is asymmetric or not, in the case of a horizontal split and in the case of a vertical split respectively. The horizontal_asymmetric_type syntax element indicates, for a block split horizontally and asymmetrically, if it is split according to the HOR_UP or to the HOR_DOWN asymmetric binary split mode. The vertical_asymmetric_type syntax element indicates, for a block split vertically and asymmetrically, if it is split according to the VER_LEFT or to the VER_RIGHT asymmetric binary split mode.

In a specific embodiment, the syntax elements horAsysmmetricFlag and horizontal_asymmetric_type (verAsysmmetricFlag and vertical_asymmetric_type respectively) are not present in the case where asymmetric horizontal splitting (asymmetric vertical splitting respectively) is not allowed.

TABLE 1

| | Descriptor |
|---|---|
| coding_binary_tree( x0, y0, width, height, cqtDepth ) { | |
|   if(btSplitAllowed(x0,y0,width,height){ | |
|     bt_split_mode(x0,y0,width,height,cqtDepth) | |
|   } | |
|   if( btSplitFlag ) { | |
|     if(btSplitMode==HOR) | |
|     { | |
|       x1 = x0 | |
|       y1 = y0 + ( height >> 1) | |
|       sub_width_1 = sub_width_0 = width; | |
|       sub_height_1 = sub_height_0 =(height >> 1) | |
|     } | |
|     if(btSplitMode==VER) | |
|     { | |
|       x1 = x0 + ( width >> 1 ) | |
|       y1 = y0 | |
|       sub_width_1 = sub_width_0 = ( width >> 1 ) | |
|       sub_height_1 = sub_height_0 = height | |
|     } | |
|     *if(btSplitMode==HOR_UP)* | |
|     *{* | |
|       *x1 = x0* | |
|       *y1 = y0 + ( height >> 2 )* | |
|       *sub_width_1 = sub_width_0 = width* | |
|       *sub_height_0 = (height >> 2)* | |
|       *sub_height_1 = ( (height *3) >> 2)* | |
|     *}* | |
|     *if(btSplitMode==HOR_DOWN)* | |
|     *{* | |
|       *x1 = x0* | |
|       *y1 = y0 + ( (height*3) >> 2 )* | |
|       *sub_width_1 = sub_width_0 = width* | |
|       *sub_height_0 = ( (height *3) >> 2)* | |
|       *sub_height_1 = (height >> 2)* | |
|     *}* | |
|     *if(btSplitMode==VER_LEFT)* | |
|     *{* | |
|       *x1 = x0 + ( width >> 2 )* | |
|       *y1 = y0* | |
|       *sub_width_0 = width >> 2* | |
|       *sub_width_1 = (width *3) >> 2* | |
|       *sub_height_1 = sub_height_0 = height* | |
|     *}* | |
|     *if(btSplitMode==VER_RIGHT)* | |
|     *{* | |
|       *x1 = x0 + ( width*3) >> 2* | |
|       *y1 = y0* | |
|       *sub_width_0 = (width*3) >> 2* | |
|       *sub_width_1 = width >> 2* | |
|       *sub_height_1 = sub_height_0 = height* | |
|     *}* | |
|     coding_binary_tree( x0, y0, sub_width, sub_height, cqtDepth ) | |
|     if( x1 < pic_width_in_luma_samples && y1 < pic_height_in_luma_samples) | |
|       coding_binary_tree( x1, y1, sub_width, sub_height, cqtDepth ) | |
|     } | |
|   }else | |
|     coding_unit( x0, y0, width, height ) | |
| } | |

TABLE 2

| | Descriptor |
|---|---|
| bt_split_mode(x0,y0,width,height,cqtDepth){ | |
|   if(btSplitAllowed(x0,y0,width,height){ | |
|     btSplitFlag | ae(v) |
| if (btSplitFlag == true){ | |
|     if(horizontalSplitAllowed && verticalSplitAllowed){ | |
|       btSplitOrientation | ae(v) |
|       if(btSplitOrientation==HOR && horizontal_asymmetric_allowed){ | |
|         horAsymmetricSplitFlag | ae(v) |
|         if(AsymmetricSplitFlag==true){ | |
|           horizontal_asymmetric_type | ae(v) |
|         } | |
|       } | |
|       if(btSplitOrientation==VER && vertical_asymmetric_allowed){ | |
|         verAsymmetricSplitFlag | ae(v) |
|         if(AsymmetricSplitFlag==true){ | |
|           vertical_asymmetric_type | ae(v) |
|         } | |
|       } | |
|     } | |
|   } | |
| } | |

Figure 11:
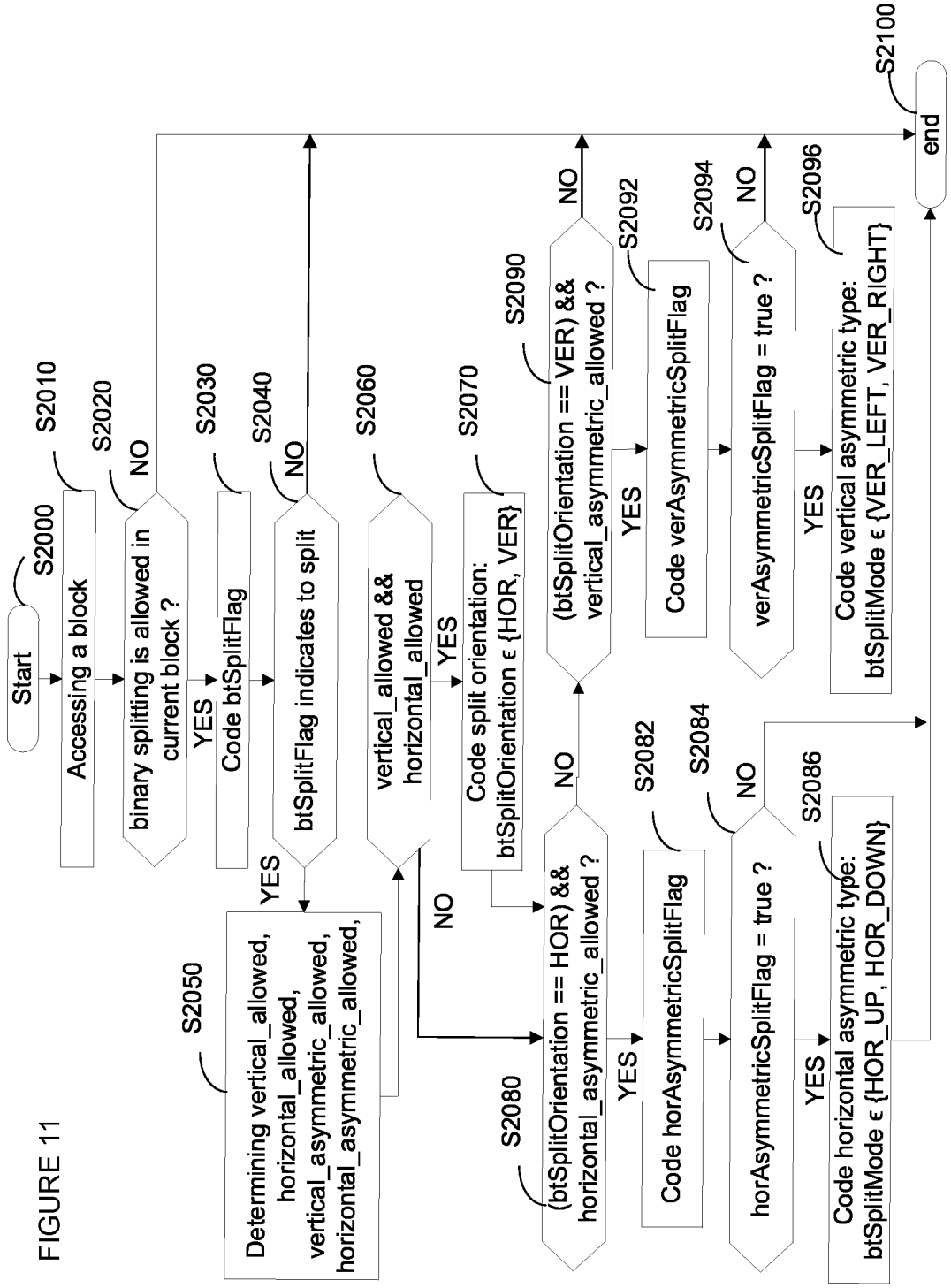
FIG. 11 represents a flowchart of a method for encoding binary splitting information for a current block according to a specific and non-limiting embodiment.

FIG. 11 represents a flowchart of a method for encoding binary splitting information for a current block according to a specific and non-limiting embodiment using the amended syntax defined in tables 1 and 2.

On FIG. 11 only the steps relating to the binary split mode encoding of a current block are represented. The method starts at step S2000. At step S2010, a transmitter 200 such as the encoder 400 accesses the current block.

At step S2020, the transmitter 200 checks whether binary splitting is allowed for the current block. This typically consists in checking if the current block width (w) or the current block height (h) is higher than a first threshold (minBTSize). A typical of minimum rectangular block size in width or height is minBTSize=4. If not, the block is not split and no other syntax element related to the splitting is coded.

Otherwise (binary splitting is allowed), a first flag (btSplitFlag) is encoded at step S2030 to indicate if the current block is split or not. As an example btSplitFlag may take the value 1 or True to indicate that the current block is split and a value False or 0 to indicate that the current block is not split. At step S2040, the transmitter 200 checks whether the first flag indicates that the current block is split or not.

In the case where the first flag indicates, at step S2040, that the current block is not split (e.g. because btSplitFlag=False), then no other syntax element related to the splitting is coded.

Otherwise, in the case where the first flag indicates, at step S2040, that the current block is split (e.g. because btSplitFlag=True), the transmitter 200 determines at step S2050 whether horizontal, vertical, asymmetric horizontal and asymmetric vertical split modes are allowed for the current block.

As an example, the vertical split modes are allowed if the following condition is true (w>minBTSize && w %3≠0), where % is the modulo operator. w %3 returns the remainder after division of w by 3. Typically, minBTSize may be equal to 4 and vertical split mode is allowed if w is equal to 8, 16 or 32.

In this case vertical_allowed parameter may be set to the value 1 or true. As an example, the horizontal split modes are allowed if the following condition is true (h>minBTSize && h %3≠0). In this case horizontal_allowed parameter may be set to the value 1 or true. As an example, the vertical asymmetric split modes are allowed if the following condition is true vertical_allowed && w>8. As an example, the horizontal asymmetric split modes are allowed if the following condition is true horizontal_allowed && h>8. Thus, typical allowed block width or height resulting from an asymmetric horizontal or vertical split is 16/4=4, 16*3/4=12, 32/4=8, 32*3/4=24.

In this embodiment, if the block has already been split in an asymmetric way, then we do not allow a further split of the block in the direction in which the block has a size multiple of 3. Moreover, some restriction on the block size is put to allow the asymmetric splitting of the block.

Typically, the block size should be higher than 8. In this case, the minimum block's size that is a multiple of 3 is 12.

In a specific embodiment, the binary splitting of a block whose size is equal to 3·2$^n$, n≥1 in one direction is allowed along that direction, given that the block to split has size multiple of 2. This means the splitting of a block could lead to a block size of 3. For example, a block 12×4 could be split into 2 sub-block, each with size 6×4.

In another specific embodiment, the asymmetric splitting of a block is allowed provided that its size is higher than 8, and is a power of 2. For instance, this allows asymmetric splitting of a block with size 8×4 into two sub coding units with sizes 6×4 and 2×4. This may be possible in particular in the Chroma component where the QTBT tool allows block sizes down to 2. In such case, the condition vertical_allowed && w>8 is replaced by the condition vertical_allowed && w≥8. Similarly, in such case, the condition horizontal_allowed && w>8 is replaced by the condition horizontal_allowed && w≥8.

At step S2060, the transmitter 200 checks whether both horizontal and vertical split modes are allowed. If so, a syntax element (btSplitOrientation) is coded at step S2070 to indicate the binary splitting orientation (horizontal or vertical). If either horizontal or vertical splitting is not allowed, then this syntax element (btSplitOrientation) is not coded. In this latter case, the binary splitting orientation is inferred on the decoder side as follows: If horizontal splitting is not allowed, then the btSplitOrientation is inferred to be equal to VER. Otherwise, if vertical splitting is not allowed, the btSplitOrientation is inferred to be equal to HOR.

Then, the transmitter 200 checks at step S2080 (in case of horizontal splitting) or at step S2090 (in case of vertical splitting), if the asymmetric split mode is allowed along this orientation. If not, no further syntax element related to splitting is coded. In this latter case, the binary split mode is inferred to be HOR or VER on the decoder side, depending on the btSplitOrientation value.

Otherwise, a syntax element (horAsymmetricSplitFlag or verAsymmetricSplitFlag) is encoded (at step S2082 or S2092) to indicate whether or not asymmetric splitting is used for the current block.

As an example, horAsymmetricSplitFlag (verAsymmetricSplitFlag respectively) may take the value 1 or True to indicate that the current block is asymmetrically split and a value False or 0 to indicate that the current block is not asymmetrically split. At step S2084 (S2094 respectively), the transmitter 200 checks whether the current block is asymmetrically split horizontally (vertically respectively).

If asymmetric splitting is not used (e.g. horAsymmetricSplitFlag is false at step S2084 or verAsymmetricSplitFlag is False at step S2094), no further syntax element related to splitting is coded. If asymmetric splitting is used (horAsymmetricSplitFlag is true at step S2084 or verAsymmetricSplitFlag is True at step S2094), then another syntax element (horizontal_asymmetric_type or vertical_asymmetric_type) is encoded (at step S2086 or S2096) to indicate the asymmetric split mode of the current block.

horizontal_asymmetric_type may take the values HOR_UP or HOR_DOWN and vertical_asymmetric_type may take the values VER_LEFT or VER_RIGHT.

The method ends at step S2100.

Decoding Apparatus

Figure 12:
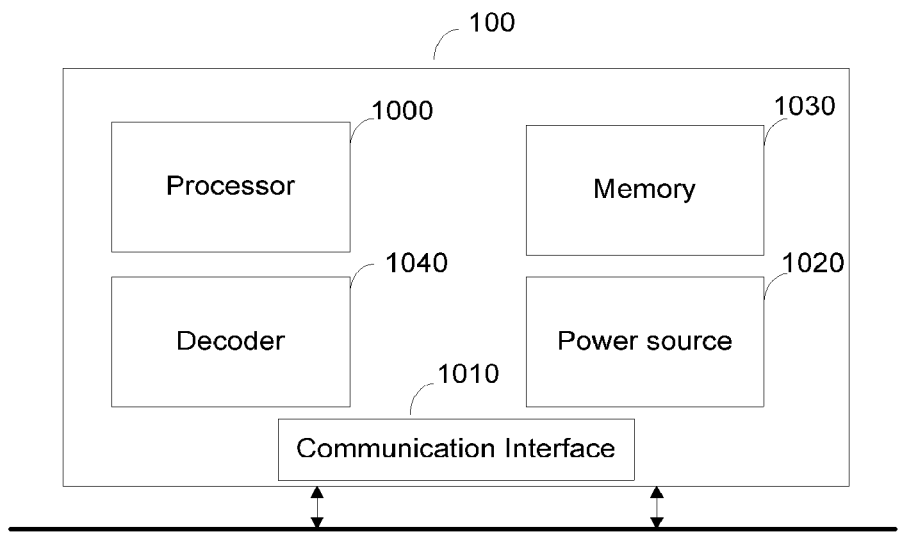
FIG. 12 represents an exemplary architecture of a receiver configured to decode an image block from a bitstream to obtain a decoded image block according to a non-limiting embodiment.

FIG. 12 represents an exemplary architecture of a receiver 100 configured to decode an image block from a bitstream to obtain a decoded image block according to a non-limiting embodiment.

The receiver 100 comprises one or more processor(s) 1000, which could comprise, for example, a CPU, a GPU and/or a DSP (English acronym of Digital Signal Processor), along with internal memory 1030 (e.g. RAM, ROM and/or EPROM). The receiver 100 comprises one or more communication interface(s) 1010 (e.g. a keyboard, a mouse, a touchpad, a webcam), each adapted to display output information and/or allow a user to enter commands and/or data (e.g. the decoded image block); and a power source 1020 which may be external to the receiver 100. The receiver 100 may also comprise one or more network interface(s) (not shown). The decoder module 1040 represents the module that may be included in a device to perform the decoding functions. Additionally, the decoder module 1040 may be implemented as a separate element of the receiver 100 or may be incorporated within processor(s) 1000 as a combination of hardware and software as known to those skilled in the art.

The bitstream may be obtained from a source. According to different embodiments, the source can be, but is not limited to:
    a local memory, e.g. a video memory, a RAM, a flash memory, a hard disk;
    a storage interface, e.g. an interface with a mass storage, a ROM, an optical disc or a magnetic support;
    a communication interface, e.g. a wireline interface (for example a bus interface, a wide area network interface, a local area network interface) or a wireless interface (such as a IEEE 802.11 interface or a Bluetooth interface); and
    a picture capturing circuit (e.g. a sensor such as, for example, a CCD (or Charge-Coupled Device) or CMOS (or Complementary Metal-Oxide-Semiconductor)).

According to different embodiments, the decoded image block may be sent to a destination, e.g. a display device. As an example, the decoded image block is stored in a remote or in a local memory, e.g. a video memory or a RAM, a hard disk. In a variant, the decoded image block is sent to a storage interface, e.g. an interface with a mass storage, a ROM, a flash memory, an optical disc or a magnetic support and/or transmitted over a communication interface, e.g. an interface to a point to point link, a communication bus, a point to multipoint link or a broadcast network.

According to a specific and non-limiting embodiment, the receiver 100 further comprises a computer program stored in the memory 1030. The computer program comprises instructions which, when executed by the receiver 100, in particular by the processor 1000, enable the receiver to execute the decoding method described with reference to FIGS. 14 and/or 15. According to a variant, the computer program is stored externally to the receiver 100 on a non-transitory digital data support, e.g. on an external storage medium such as a HDD, CD-ROM, DVD, a read-only and/or DVD drive and/or a DVD Read/Write drive, all known in the art. The receiver 100 thus comprises a mechanism to read the computer program. Further, the receiver 100 could access one or more Universal Serial Bus (USB)-type storage devices (e.g., "memory sticks.") through corresponding USB ports (not shown).

According to exemplary and non-limiting embodiments, the receiver 100 can be, but is not limited to:
    a mobile device;
    a communication device;
    a game device;
    a set top box;
    a TV set;
    a tablet (or tablet computer);
    a laptop;
    a video player, e.g. a Blu-ray player, a DVD player;
    a display and
    a decoding chip or decoding device/apparatus.

Figure 13:
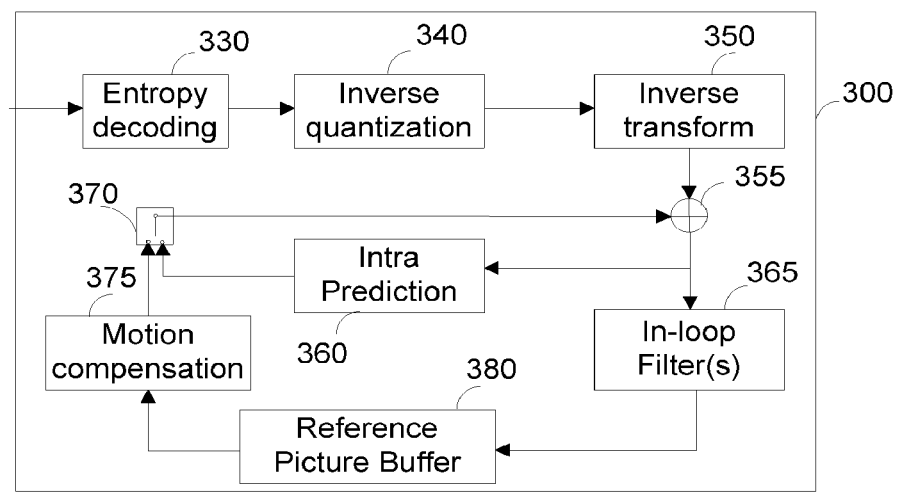
FIG. 13 illustrates a block diagram of an exemplary video decoder adapted to execute the decoding method of FIGS. 14 and/or 15.
Figure 14:
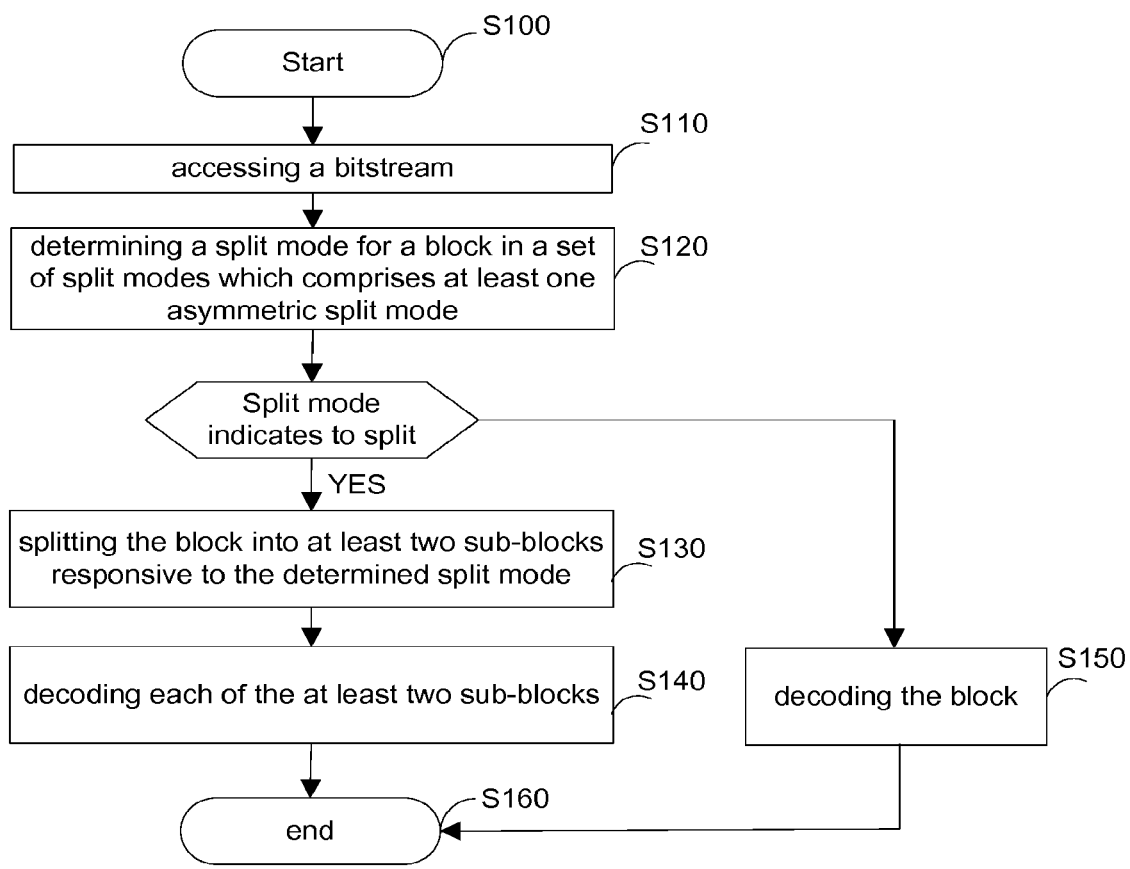
FIG. 14 represents a flowchart of a method for decoding a block of an image from a bitstream according to a specific and non-limiting embodiment.

FIG. 13 illustrates a block diagram of an exemplary video decoder 300 adapted to execute the decoding method of FIGS. 14 and/or 15. The video decoder 300 is an example of a receiver 100 or may be part of such a receiver 100. In the exemplary decoder 300, a bitstream is decoded by the decoder modules as described below. Video decoder 300 generally performs a decoding pass reciprocal to the encoding pass performed by the video encoder 400 as described in FIG. 6.

In particular, the input of the decoder includes a video bitstream, which may be generated by the video encoder 400. The bitstream is first entropy decoded (module 330) to obtain transform coefficients, motion vectors, and other coded information. The transform coefficients are de-quantized (module 340) and inverse transformed (module 350) to decode residuals. The decoded residuals are then combined (module 355) with a predicted sample block (also known as a predictor) to obtain a decoded/reconstructed image block. The predicted sample block may be obtained (module 370) from intra prediction (module 360) or motion-compensated prediction (i.e., inter prediction) (module 375). An in-loop filter (module 365) may be applied to the reconstructed image. The in-loop filter may comprise a deblocking filter and a SAO filter. The filtered image is stored in a reference picture buffer 380.

Decoding Methods

FIG. 14 represents a flowchart of a method for decoding a block of an image from a bitstream according to a specific and non-limiting embodiment. The block is of size w×h, where w is its width in pixel units and h is its height in pixel units. The block is one of a block of luma samples, a block of chroma samples or a coding unit formed by of a block of luma samples and two blocks of chroma samples.

The method starts at step S100. At step S110, a receiver 100 such as the decoder 300 accesses a bitstream or a portion of it representative of the block to be decoded.

At step S120, the receiver determines a split mode for the block in a set of split modes. The split mode is for example decoded from the bitstream. According to the present principles, the set of split modes comprises at least one asymmetric split mode. FIG. 8 depicts examples of such asymmetric split modes. In a first embodiment, the at least one asymmetric split mode indicates to split the block horizontally into one sub-block of height h/4 and one sub-block of height 3 h/4. The sub-block of height h/4 is either above (mode HOR_UP) or below (mode HOR_DOWN) the sub-block of height 3 h/4. In another embodiment, the at least one asymmetric split mode indicates to split the block vertically into one sub-block of width w/4 and one sub-block of width 3 w/4. The sub-block of width w/4 is either on the left (mode VER_LEFT) or right (mode VER_RIGHT) of the sub-block of width 3 w/4. In a specific embodiment, the set of split modes comprises all the split modes depicted on FIG. 8. In a variant embodiment, the at least one asymmetric split mode indicates to split the block either horizontally or vertically into sub-blocks whose size is not a power of two, e.g. their size in width or height is equal to $3.2^n$ with n being an integer.

In a variant, the set of split modes comprises in addition to the at least one asymmetric split mode, the split modes defined by QTBT and depicted on FIG. 4. In the case where the split mode indicates that the block is not further split (NO_SPLIT), then the block is decoded at step S150.

Otherwise, at step S130, the receiver splits the accessed block into at least two sub-blocks responsive to the determined split mode.

At step S140, the transmitter decodes each of the at least two sub-blocks. Decoding the at least two sub-blocks may comprise recursively applying the steps S120 to S140 on each of the at least two sub-blocks. The recursive splitting ends when the block is not further split, e.g. because the split mode NO_SPLIT is determined at step S120. In this case, the block is decoded at step S150 by applying the following steps:

decoding, e.g. entropy decoding and inverse quantizing, a transformed block for said sub-block;
  applying a same transform (inverse of the one used on the encoder side) on on samples of said decoded transformed block to obtain a residual block;
  applying a same prediction on samples of said sub-block to obtain a predicted block;
  reconstructing said sub-block from said predicted block and said residual block.

The method ends at step S160.

Splitting information indicating how the block is split is also decoded from the bitstream.

Figure 15:
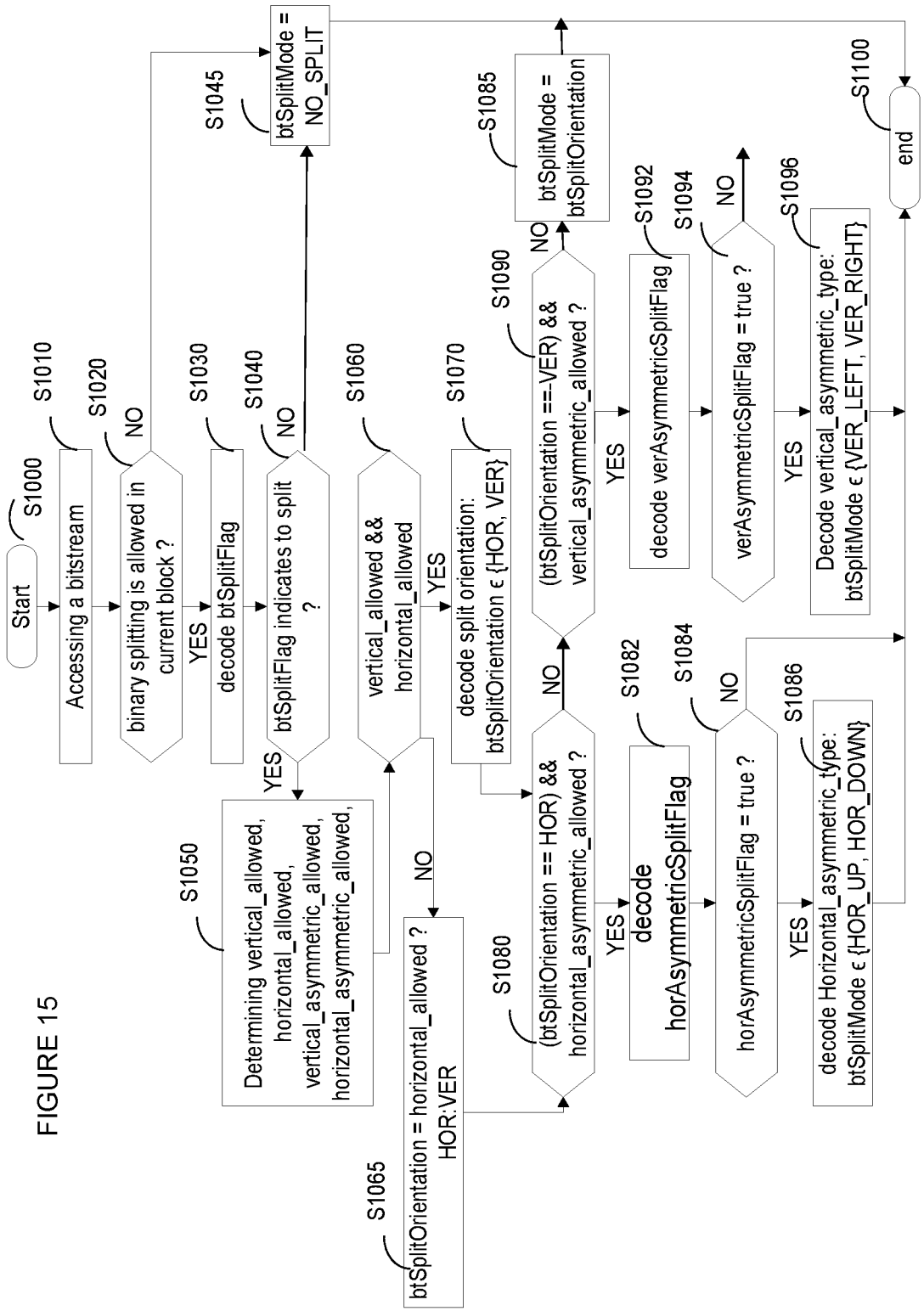
FIG. 15 represents a flowchart of a method for decoding split mode of a current block in case of binary splitting according to a specific and non-limiting embodiment.

FIG. 15 represents a flowchart of a method for decoding split mode of a current block in case of binary splitting according to a specific and non-limiting embodiment using the amended syntax defined in tables 1 and 2.

On FIG. 15 only the steps relating to the binary split mode decoding of a current block are represented. The method starts at step S1000. At step S1010, a receiver 100 such as the decoder 300 accesses a bitstream or a portion of it representative of the current block to be decoded.

At step S1020, the receiver 100 checks whether binary splitting is allowed for the current block to be decoded. This typically consists in checking if the current block width (w) or the current block height (h) is higher than a first threshold (minBTSize). A typical of minimum rectangular block size in width or height is minBTSize=4. If the binary splitting is not allowed, the block is not split (btSplitMode is set to NO_SPLIT at step S1045) and no other syntax element related to the splitting is decoded.

Otherwise (the binary splitting is allowed), a first flag (btSplitFlag) is decoded from the bitstream at step S1030 that indicates if the current block is split or not.

At step S1040, the receiver 100 checks whether the current block is split or not. If the current block is not split (e.g. btSplitFlag is False at step S1040), then no other syntax element related to the splitting is decoded. btSplitMode is set to NO_SPLIT at step S1045.

In the case where the current block is split (btSplitFlag is True at step S1040), the receiver 100 determines at step S1050 whether horizontal, vertical, asymmetric horizontal and asymmetric vertical split modes are allowed for the current block. Step S1050 is identical to step S2050 of FIG. 11.

At step S1060, the receiver 100 checks whether both horizontal and vertical split modes are allowed. If so, a syntax element (btSplitOrientation) is decoded at step S1070 to indicate the binary splitting orientation (horizontal or vertical). If either horizontal or vertical splitting is not allowed, then this syntax element (btSplitOrientation) is not decoded. In this latter case, the binary splitting orientation is inferred at step S1065. If horizontal splitting is not allowed, then the btSplitOrientation is inferred to be equal to VER. Otherwise, if vertical splitting is not allowed, the btSplitOrientation is inferred to be equal to HOR.

Then, the receiver 100 checks at step S1080 (in case of horizontal splitting) or at step S1090 (in case of vertical splitting), if the asymmetric split mode is allowed along this orientation. If not, no further syntax element related to splitting is decoded. In this latter case, the binary split mode is inferred to be HOR or VER depending on the btSplitOrientation value (btSplitMode is set to btSplitOrientation at step S1085).

Otherwise, a syntax element (horAsymmetricSplitFlag or verAsymmetricSplitFlag) is decoded (at step S1082 or S1092) that indicates whether or not asymmetric splitting is used for the current block. At step S1084 (S1094 respectively), the receiver 100 checks whether the current block is asymmetrically split horizontally (vertically respectively).

If asymmetric splitting is not used (horAsymmetricSplitFlag or verAsymmetricSplitFlag is not True), no further syntax element related to splitting is decoded. If asymmetric splitting is used (horAsymmetricSplitFlag or verAsymmetricSplitFlag is True), then a syntax element (horizontal_asymmetric_type or vertical_asymmetric_type) is decoded (at step S1086 or S1096) that indicate the asymmetric split mode for the current block.

horizontal_asymmetric_type may take the values HOR_UP or HOR_DOWN and vertical_asymmetric_type may take the values VER_LEFT or VER_RIGHT.

If horizontal_asymmetric_type takes value HOR_UP, then the binary splitting mode (btSplitMode) is set equal to HOR_UP.

If horizontal_asymmetric_type takes value HOR_DOWN, then the binary splitting mode is set equal to HOR_DOWN.

If vertical_asymmetric_type takes value VER_LEFT, then the binary splitting mode is set equal to VER_LEFT.

If horizontal_asymmetric_type takes value VER_LEFT, then the binary splitting mode is set equal to VER_LEFT.

The method ends at step S1100.

Entropy Coding and Decoding of the Syntax Elements

The new syntax elements verAsymmetricSplitFlag and horAsymmetricSplitFlag may be encoded in different ways. In a first embodiment, verAsymmetricSplitFlag (horAsymmetricSplitFlag respectively) is coded with a single bit in the bit-stream. This is optimal only if symmetric and asymmetric split modes have equal probability, that is to say verAsymmetricSplitFlag (horAsymmetricSplitFlag respectively) has a probability of 0.5 to be equal to true. In that case, the average amount of information respectively brought by these syntax elements is equal to 1 bit, and a fixed-length coding with 1 bit is optimal.

In most practical cases, the symmetric and asymmetric split modes are likely not to be equi-probable. Therefore, according to another embodiment, a context-based arithmetic coding is used to encode the syntax elements verAsymmetricSplitFlag and horAsymmetricSplitFlag. Context-based arithmetic coding comprises context modelling and arithmetic coding. In specific embodiments, it may comprise prior to the context modeling a binarization of the syntax elements. Binarization and arithmetic coding are well-known from past encoding schemes (e.g. H.264 and HEVC). Context modeling estimates the probability of each syntax element based on some context and applies symmetrically on the encoder and decoder sides. The following embodiments disclosed with respect to entropy coding also applies to entropy decoding. New contexts are thus defined for the new syntax elements horAsymmetricFlag and verAsymmetricFlag.

In this embodiment, two simple contexts are used, respectively associated with each syntax element horAsymmetricFlag and verAsymmetricFlag. Each of these contexts only depends on the values taken in the past (i.e. when encoding blocks preceding the current block in coding order) by the concerned syntax element itself. Therefore, one is able to encode this asymmetric split mode information over an average amount of information that is close to the first order entropy of the random variable represented by the considered syntax element. These syntax elements are thus encoded over less than one bit on average, in the case where the statistical distributions of these flags are not uniform. In a variant of this context-based coding, the contexts used for the horAsymmetricFlag and verAsymmetricFlag are the same. Indeed, the coding of these two syntax elements may share the same context. This would be efficient if we assume that the probabilities of horAsymmetricFlag being TRUE or FALSE knowing that current block is binary split in the horizontal orientation are close to the probabilities of verAsymmetricFlag being TRUE or FALSE, knowing that current block is binary split in the vertical orientation.

In a third embodiment, these syntax elements verAsymmetricSplitFlag and horAsymmetricSplitFlag are entropy coded as a function of some contextual information related to the splitting configurations already decided in preceding neighboring blocks. When asymmetric splitting is used for the current block, then one sub-block of the two-sub-blocks has a size equal to the quarter of current block's size in width or height. This means that the original signal in the current block contains some spatial activity or discontinuity, and that it is valuable to split current block in terms of coding efficiency. Such high spatial activity or discontinuity is likely to be present also in neighboring blocks that precede current block in coding order.

Contexts are defined to encode the asymmetric splitting syntax elements as a function of the number of sub-blocks that have a size smaller or equal to the quarter of current block size, along the considered splitting orientation. This takes the following form, respectively for the horizontal and vertical asymmetric splitting contexts:

determining nbQuarterHeightSubCU=number of sub-block having a height smaller or equal to height/4 in the left neighboring block, where height=height of current block;

$$\text{determining horAsymmetricSplitCtxt}=(\text{nbQuarterHeightSubCU}>0?1:0) \quad (1)$$

According to equation (1), two different contexts are used for coding the horAsymmetricSplitFlag syntax element. If the value nbQuarterHeightSubCU is strictly greater than zero, then a first context (with index 0) is used to encode the binary symbol that corresponds to horAsymmetricSplitFlag. In the opposite case, if the value nbQuarterHeightSubCU is equal to zero, then a second context (with index 1) is used to encode the binary symbol that corresponds to horAsymmetricSplitFlag.

The left neighboring block corresponds to the block with height greater than or equal to current block's height, and whose right boundary has a x-coordinate equal to the x-coordinate of current block's left boundary minus 1. The left neighboring block may be split into one or several sub-blocks in height.

determining nbQuarterWidthSubCU=number of subblock having a width smaller or equal to width/4 in the top neighboring block where width=width of current block;

$$\text{determining verAsymmetricSplitCtxt}=(\text{nbQuarterWidthSubC}>0?1:0) \quad (2)$$

According to equation (2), two different contexts are used for coding the verAsymmetricSplitFlag syntax element. If the value nbQuarterWidthSubCU is strictly greater than zero, then a first context (with index 0) is used to encode the binary symbol that corresponds to verAsymmetricSplitFlag. In the opposite case, if the value nbQuarterWidthSubCU is equal to zero, then a second context (with index 1) is used to encode the binary symbol that corresponds to verAsymmetricSplitFlag.

The top neighboring block corresponds to the block with width greater than or equal to current block's width, and whose bottom boundary has a y-coordinate equal to the y-coordinate of current block's top boundary minus 1. The top neighboring block may be split into one or several sub-blocks in width.

According to another embodiment, the context used to code the asymmetric splitting flags verAsymmetricSplitFlag and horAsymmetricSplitFlag are determined as a function of the presence of a neighboring block with a size higher than half of the size of the current block, respectively in width and height. This takes the following form. First, the context used to code the coding of element horAsymmetricSplitFlag is determined as follows:

Determining if the block located on the left of the top-left corner of current CU has a height higher than the half of current block's height.

Determining if the block located on the left side of the bottom-left corner of current CU has a height greater than the half of current block's height.

If one of the above tests is positive, then horAsymmetricSplitCtxt is given value 0.

Otherwise horAsymmetricSplitCtxt is given value 1.

Similarly, the context used to code the coding of element verAsymmetricSplitFlag is determined as follows:

Determining if the block located on top of the top-left corner of current CU has a width higher than the half of current block's width.

Determining if the block located on top of the top-right corner of current CU has a width greater than the half of current block's width.

If one of the above tests is positive, then verAsymmetricSplitCtxt is given value 0.

Otherwise verAsymmetricSplitCtxt is given value 1.

According to a further embodiment, some separate contexts are used to code/decode the horAsymmetricSplitFlag and verAsymmetricSplitFlag according to the slice type (INTRA or INTER). In an INTER slice, the above context determination method is used. In an INTRA slice, a single context is used, respectively for the horAsymmetricSplitFlag and verAsymmetricSplitFlag, to capture the statistical behavior of these two flags, regardless of the contextual block size information available when coding/decoding these flags.

The advantage of this embodiment is to better model the statistical dependencies between the coded flags and the neighboring blocks information, especially in INTER slices, which reduces the rate cost associated with the coding of these flags.

According to a further embodiment the context proposed in one of the preceding embodiments is indexed as a function of the quad-tree plus binary tree depth value associated with the current block. Therefore, a separate set of contexts is used for each depth level in the quad-tree plus binary-tree representation of the CTU. Advantageously, a more precise context is used to model the statistical behavior of syntax elements being coded/decoded.

In the third embodiment, a set of two different contexts is used to perform context adaptive coding of syntax elements horAsymmetricSplitFlag and verAsymmetricSplitFlag. Therefore, the sets of contexts are denoted as follows:

horAsymmetricSplitFlagCtx[0 . . . 1]
verAsymmetricSplitFlagCtx[0 . . . 1]

In the present embodiment, the contexts are indexed by the depth of the processed block in the quad-tree plus binary tree CTU representation. Thus, the two above sets of contexts are further indexed based on the depth level:

horAsymmetricSplitFlagCtx[0 . . . maxDepth][0 . . . 1]
verAsymmetricSplitFlagCtx[0 . . . maxDepth][0 . . . 1]

Where maxDepth represents the maximum depth of a block. Here by depth we mean the sum of the quad-tree and the binary-tree depths of current block.

According to a further embodiment the context proposed in one of the preceding embodiments is indexed as a function of the shape of the block, i.e. the width and height. This means that a separate set of contexts is used for each tuple (w, h) of possible Coding Size. The advantage of this embodiment is a further improved context to model the statistical behavior of syntax elements being coded/decoded. Advantageously, a more precise context is used to model the statistical behavior of syntax elements being coded/decoded.

In the present embodiment, the contexts are indexed by the log 2 of the width and by the log 2 of the height of the block:

horAsymmetricSplitFlagCtx[0 . . . maxLog 2CUHeight][0 . . . 1]

verAsymmetricSplitFlagCtx[0 . . . maxLog 2CUWidth][0 . . . 1]

where maxLog 2CUWidth and maxLog 2CUHeight represent the log 2 of the maximum possible block width and block height equal to a power of 2.

The contexts are associated with block sizes equal to a power of 2 since the asymmetric splitting may only be applied to block size equal to a power of 2.

The new syntax elements horizontal_asymmetric_type or vertical_asymmetric_type may be encoded in different ways. In a first embodiment, horizontal_asymmetric_type (vertical_asymmetric_type respectively) is coded with a single bit in the bit-stream.

This is optimal only if horizontal_asymmetric_type or vertical_asymmetric_type syntax elements have equal probability.

According to another embodiment, a context-based arithmetic coding is used to encode the syntax elements horizontal_asymmetric_type or vertical_asymmetric_type. In this embodiment, two simple contexts, respectively associated with each syntax element horizontal_asymmetric_type or vertical_asymmetric_type are used. Each of these contexts only depends on the values taken in the past (i.e. when encoding blocks preceding in coding order) by the concerned syntax element itself. In a variant of this context-based coding, the contexts used for the horizontal_asymmetric_type and vertical_asymmetric_type may be the same. The coding of these two syntax elements thus share the same context. This would be efficient if we assume that the probabilities of horizontal_asymmetric_type being TRUE or FALSE knowing that current block is asymmetrically binary split in the horizontal orientation are close to the probabilities of vertical_asymmetric_type being TRUE or FALSE, knowing that current block is asymmetrically binary split in the vertical orientation.

Figure 16:
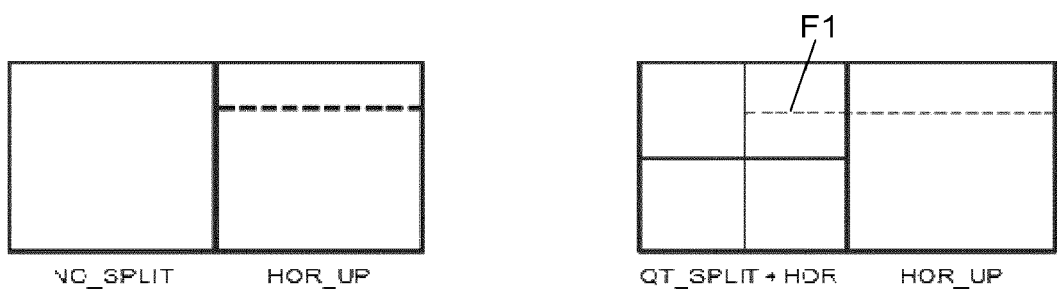
FIGS. 16 and 17 illustrates the entropy coding process of syntax elements representative of asymmetric split modes according to the present principles.
Figure 17:
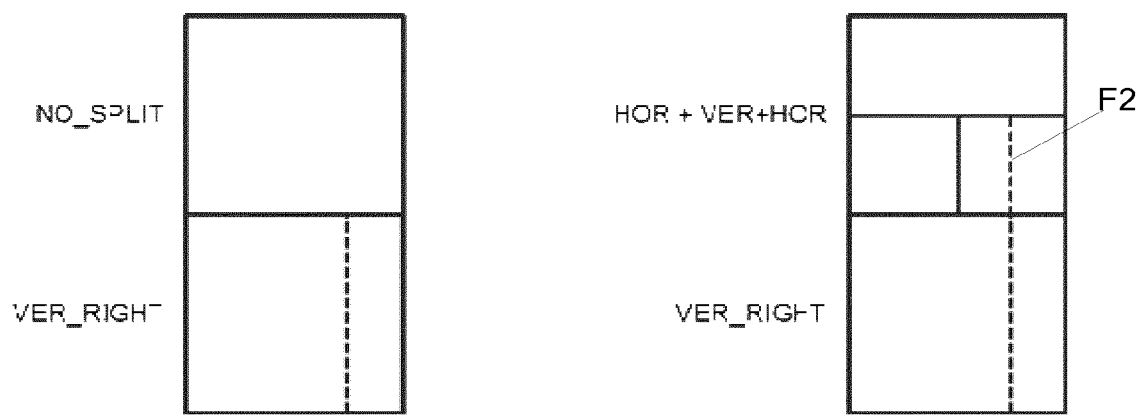

In a third embodiment, these syntax elements horizontal_asymmetric_type or vertical_asymmetric_type are entropy coded as a function of some contextual information related to the splitting configurations already decided in preceding neighboring blocks as illustrated on FIGS. 16 and 17. In horizontal asymmetric splitting, if a splitting frontier (F1 on FIG. 16) in a previous block on the left of the current block exists and spatially coincides with an horizontal frontier that would appear in the current block through the choice of a horizontal asymmetric splitting, then the probability of use of this asymmetric splitting in the current block is increased.

This principle is illustrated on FIG. 16. On the left side of the figure, candidate HOR_UP split mode is being evaluated in the current block, while the neighboring block on the left was not split. The probability of use of the HOR_UP split mode for the current block in that case is lower than in the case depicted on the right of FIG. 16. Indeed, in this latter case, the neighboring block was encoded with a splitting configuration that contains a horizontal frontier that would be propagated in the current block by the choice of the HOR_UP split mode. Choosing the HOR_UP split mode in the current block is more likely to occur in this case than in the previous case depicted on left side of FIG. 16.

This principle is also illustrated on FIG. 17 in the case of vertical asymmetric splitting. VER_RIGHT split mode has a higher probability of being used to encode the current block in the case depicted on the right of FIG. 17 than in the case on the left of FIG. 17 because it propagates the vertical frontier F2 from the neighboring block located above the current block into the current block.

Based on this principle, the following contexts are used to code and decode the syntax element horizontal_asymmetric_type:

determining if there is a frontier in the left neighboring block aligned with the frontier that would result from the HOR_UP asymmetric type. Depending on the results, hor_up_aligned_boundary is set to true or false.

determining if there is a frontier in the left neighboring block aligned with the frontier that would result from the HOR_DOWN asymmetric type. Depending on the results, hor_down_aligned_boundary is set to true or false.

determining the context index among values (0, 1, 2) as follows:

$$\text{hor\_asymmetric\_type\_context} = \text{hor\_up\_aligned\_boundary} ? 1 : (\text{hor\_down\_aligned\_boundary} ? 2 ? 0) \quad (3)$$

According to equation (3), three different contexts are used for coding the horizontal_asymmetric_type syntax element. If the value hor_up_aligned_boundary is equal to TRUE, then a first context (with index 1) is used to encode the binary symbol that corresponds to horizontal_asymmetric_type. In the opposite case, if the value hor_down_aligned_boundary is equal to TRUE, then a second context (with index 2) is used to encode the binary symbol that corresponds to horizontal_asymmetric_type. Finally, if both values hor_up_aligned_boundary and hor_down_aligned_boundary are equal to FALSE, then a third context (with index 0) is used to encode the binary symbol that corresponds to horizontal_asymmetric_type.

The following contexts are used to code and decode the syntax element vertical_asymmetric_type:

Determine if there is a frontier in the above neighboring block aligned with the frontier that would result from the VER_LEFT asymmetric type. Depending on the results, ver_left_aligned_boundary is set to true or false.

Determine if there is a frontier in the above neighboring block aligned with the frontier that would result from the VER_RIGHT.

asymmetric type. Depending on the results, ver_right_aligned_boundary is set to true or false.

Compute the context index among values (0, 1, 2) as follows:

$$\text{ver\_asymmetric\_type\_context} = \text{ver\_left\_aligned\_boundary} ? 1 : (\text{ver\_right\_aligned\_boundary} ? 2 ? 0) \quad (4)$$

According to equation (4), three different contexts are used for coding the vertical_asymmetric_type syntax element. If the value ver_left_aligned_boundary is equal to TRUE, then a first context (with index 1) is used to encode the binary symbol that corresponds to vertical_asymmetric_type. In the opposite case, if the value ver_right_aligned_boundary is equal to TRUE, then a second context (with index 2) is used to encode the binary symbol that corresponds to vertical_asymmetric_type. Finally, if both values ver_left_aligned_boundary and ver_right_aligned_boundary are equal to FALSE, then a third context (with index 0) is used to encode the binary symbol that corresponds to vertical_asymmetric_type.

According to another embodiment, the coding of the syntax elements horizontal_asymmetric_type or vertical_asymmetric_type employs context respectively determined as follows. First, the context hor_asymmetric_type_context used to code the flag horizontal_asymmetric_type is determined as follows:

Obtaining the height of the block located on the left side of current block's top-left corner. This gives a value topLeftHeight Obtaining the height of the block located on the left side of current block's bottom-left corner. This gives a value bottomLeftHeight If topLeftHeight equals bottomLeftHeight then hor_asymmetric_type_context is given value 0

Else if topLeftHeight<bottomLeftHeight then hor_asymmetric_type_context is given value 1

Else (case where topLeftHeight>bottomLeftHeight) hor_asymmetric_type_context is given value 2

Hence 3 contexts are used to code/decode the flag horizontal_asymmetric_type.

Second, the context ver_asymmetric_type_context used to code the flag vertical_asymmetric_type is determined as follows:

Obtaining the width of the block located on top of current block's top-left corner. This gives value topLeftWidth Obtaining the width of the block located on top of current block's top-right corner. This gives value topRightWidth If topLeftWidth equals topRightWidth then vertical_asymmetric_type_context is given value 0

Else if topLeftWidth>topRightWidth then ver_asymmetric_type_context is given value 1

Else (case where topLeftWidth<topRightWidth) ver_asymmetric_type_context is given value 2

Hence 3 contexts are used to code/decode the flag vertical_asymmetric_type.

According to a further embodiment, some separate contexts are used to code/decode the horizontal_asymmetric_type and vertical_asymmetric_type according to the slice type (INTRA or INTER). In an INTER slice, the above context determination method is used. In an INTRA slice, a single context is used, respectively for the flags horizontal_asymmetric_type and vertical_asymmetric_type to capture the statistical behavior of these two flags, regardless the contextual block size information available when coding/decoding these flags.

The advantage of this embodiment is to better model the statistical dependencies between the coded flags and the neighboring blocks information, especially in INTER slices, which reduces the rate cost associated to the coding of these flags.

According to a further embodiment the context proposed in one of the preceding embodiments is indexed as a function of the quad-tree plus binary tree depth value associated with current block. This means that a separate set of contexts is used for each depth level in the quad-tree plus binary-tree representation of the CTU. The same principles as defined for verAsymmetricSplitFlag and horAsymmetricSplitFlag syntax elements apply.

The advantage of this embodiment is a more precise context used to model the statistical behavior of syntax elements being coded/decoded.

According to a further embodiment the context proposed in one of the preceding embodiments is indexed as a function of the shape of the coding unit, i.e. the width and height. This means that a separate set of contexts is used for each tuple (w, h) of possible coding size. The same principles as defined for verAsymmetricSplitFlag and horAsymmetricSplitFlag syntax elements apply. The advantage of this embodiment is a further improved context to model the statistical behavior of syntax elements being coded/decoded.

Variant of the Syntax of Tables 1 and 2

A variant of the syntax defined in tables 1 and 2 is depicted in table 3. It comprises:
identifying, for a current block, if it can be spatially merged with a neighboring block to form an asymmetric sub-block of a parent block. The parent block may be the parent block of current block (case 1), or the parent block of the current block's parent (case 2). This step is performed in a same way on the encoder side and on the decoder side.

Figure 18:
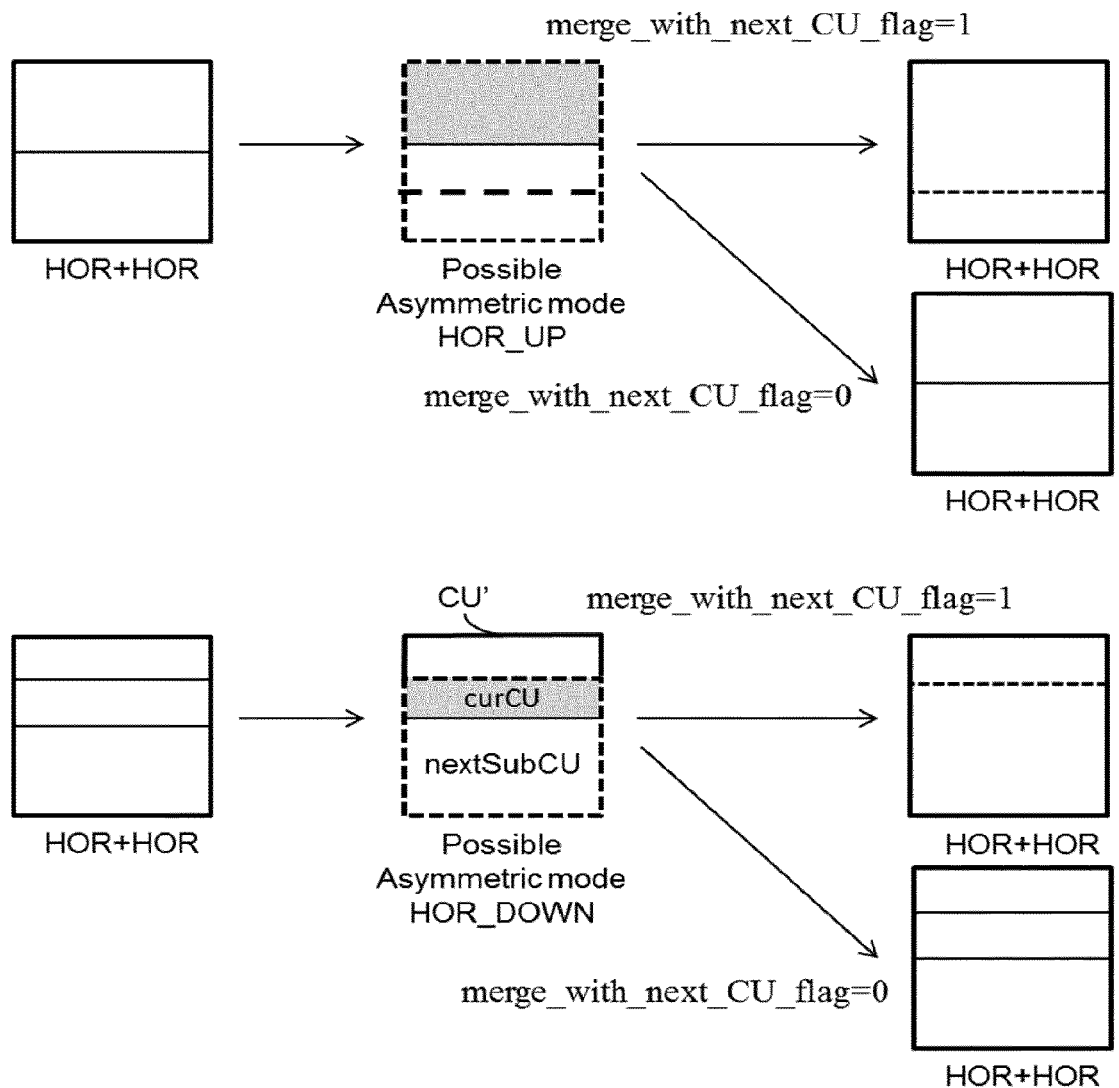
FIG. 18 illustrates a variant of the encoding syntax.

An example of case 1 is illustrated on the top of FIG. 18. On this figure, the top sub-block filed in grey can be merged with a next sub-block to form an asymmetric division of current block's parent.

An example of case 2 is shown on the bottom of FIG. 18. Current block is the block filled in grey color. On this figure, current block can be merged with next sub-block (named nextSubCU on FIG. 18) so as to form an asymmetric division of the block called CU' on FIG. 18.

coding a syntax element called merge_with_next_CU, which indicates, for current block, if it is being merged with the next block in processing order, so as to form an asymmetric block with size 3·2".

To support this embodiment with a minimum change to the initial QTBT coding syntax, the QTBT syntax is unchanged for the coding of binary trees and binary split mode.

TABLE 3

| | Descriptor |
|---|---|
| coding_binary_tree( x0, y0, width, height, cqtDepth ) { | |
|   if(btSplitAllowed(x0,y0,width,height){ | |
|     bt_split_mode(x0,y0,width,height,cqtDepth) | |
|   } | |
|   if( btSplitFlag ) { | |
|     if(btSplitMode==HOR) | |
|     { | |
|       x1 = x0 | |
|       y1 = y0 + ( height >> 1 ) | |
|       sub_width = width; | |
|       sub_height = (height >> 1) | |
|     } | |
|     else | |
|     { | |
|       x1 = x0 + ( width >> 1 ) | |
|       y1 = y0 | |
|       sub_width = ( width >> 1 ) | |
|       sub_height = height | |
|     } | |
|     coding_binary_tree( x0, y0, sub_width, sub_height, cqtDepth ) | |
|     if( x1 < pic_width_in_luma_samples && y1 < pic_height_in_luma_samples) | |
|       coding_binary_tree( x1, y1, sub_width, sub_height, cqtDepth ) | |
|   } | |
| } else{ | |
|   merge_with_next_CU_flag | ae(v) |
|   *if(!merge_with_next_CU_flag && !merge_with_previous_CU){* | |
|     coding_unit( x0, y0, width, height ) | |
| *}* | |
| *if(merge_with_pevious_CU){* | |
|   *if(horizontal_merge){* | |
|     *coding_unit( x0-(width >> 1), y0, width\*3/2, height )* | |
|   *}* | |
|   *if(vertical_merge){* | |
|     *coding_unit( x0, y0 − (height >> 1), width, height\*3/2 )* | |
|   } | |
| } | |
| } | |

A new syntax element called "merge_with_next_CU_flag" is introduced in front of the block coding when the block is not split. This flag indicates that the concerned block is not yet encoded at this stage of the bit-stream, but it is merged with the next block in scanning order. This makes is possible to form an asymmetric block with a size equal to (w*3/2, h) or (w, h*3/2), depending on the current binary splitting orientation.

The advantage of this embodiment is that it strongly reduces the amount of QTBT syntax modification needed to support the asymmetric coding units.

This embodiment disclosed with respect to FIG. 18 also applies on the decoder side. In this case, the syntax element merge_with_next_CU_flag is decoded to recover the asymmetric blocks.

The implementations described herein may be implemented in, for example, a method or a process, an apparatus, a software program, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Implementations of the various processes and features described herein may be embodied in a variety of different equipment or applications, particularly, for example, equipment or applications. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and other communication devices. As should be clear, the equipment may be mobile and even installed in a mobile vehicle.

Additionally, the methods may be implemented by instructions being performed by a processor, and such instructions (and/or data values produced by an implementation) may be stored on a processor-readable medium such as, for example, an integrated circuit, a software carrier or other storage device such as, for example, a hard disk, a compact diskette ("CD"), an optical disc (such as, for example, a DVD, often referred to as a digital versatile disc or a digital video disc), a random access memory ("RAM"), or a read-only memory ("ROM"). The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described embodiment, or to carry as data the actual syntax-values written by a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A decoding device comprising one or more processors configured for:
   determining, based on a property of a block, a context for decoding a syntax element signaled in video data specifying a position of a split in the block; and
   context-based arithmetic decoding the syntax element responsive to the context,
   wherein the property of the block is one of:
      a frontier in a neighboring block of the block is aligned with a frontier resulting from asymmetrically splitting the block;
      a frontier in a neighboring block located on a left side of the block is aligned with a frontier resulting from asymmetrically splitting the block horizontally; and
      a frontier in a neighboring block located on top of the block is aligned with a frontier resulting from asymmetrically splitting the block vertically; or
      is based on a size of a first neighboring block of the block relative to a size of a second neighboring block of the block, the size being a width or a height; or
      is based on a size of a neighboring block relative to a size of the block, the size being a width or a height.

2. The decoding device according to claim 1, wherein the property of the block is further based on a quad-tree plus binary tree depth value associated with the block.

3. The decoding device according to claim 1, wherein the property of the block is further based on a shape of the block.

4. An encoding device comprising one or more processors configured for:
   determining, based on a property of a block, a context for encoding a syntax element to be signaled in video data specifying a position of a split in the block; and
   context-based arithmetic encoding the syntax element responsive to the context, wherein the property of the block is one of:
- a frontier in a neighboring block of the block is aligned with a frontier resulting from asymmetrically splitting the block;
- a frontier in a neighboring block located on a left side of the block is aligned with a frontier resulting from asymmetrically splitting the block horizontally; and
- a frontier in a neighboring block located on top of the block is aligned with a frontier resulting from asymmetrically splitting the block vertically; or
- is based on a size of a first neighboring block of the block relative to a size of a second neighboring block of the block, the size being a width or a height; or
- is based on a size of a neighboring block relative to a size of the block, the size being a width or a height.

5. The encoding device of claim 4,
wherein the property of the block is further based on quad-tree plus binary tree depth value associated with the block; or, is based on a shape of the block.

6. A decoding method comprising:
determining, based on a property of a block, a context for decoding a syntax element signaled in video data specifying a position of a split in the block; and
context-based arithmetic decoding the syntax element responsive to the context;
wherein the property of the block is one of:
- a frontier in a neighboring block of the block is aligned with a frontier resulting from asymmetrically splitting the block;
- a frontier in a neighboring block located on a left side of the block is aligned with a frontier resulting from asymmetrically splitting the block horizontally; and
- a frontier in a neighboring block located on top of the block is aligned with a frontier resulting from asymmetrically splitting the block vertically; or
- is based on a size of a first neighboring block of the block relative to a size of a second neighboring block of the block, the size being a width or a height; or
- is based on a size of a neighboring block relative to a size of the block, the size being a width or a height.

7. The decoding method according to claim 6, wherein the property of the block is further based on a quad-tree plus binary tree depth value associated with the block.

8. The decoding method according to claim 6, wherein the property of the block is further based on a shape of the block.

9. An encoding method comprising:
determining, based on a property of a block, a context for encoding a syntax element in video data specifying a position of a split in the block; and
context-based arithmetic encoding the syntax element responsive to the context,
wherein the property of the block is one of:
- a frontier in a neighboring block of the block is aligned with a frontier resulting from asymmetrically splitting the block;
- a frontier in a neighboring block located on a left side of the block is aligned with a frontier resulting from asymmetrically splitting the block horizontally; and
- a frontier in a neighboring block located on top of the block is aligned with a frontier resulting from asymmetrically splitting the block vertically; or
- is based on a size of a first neighboring block of the block relative to a size of a second neighboring block of the block, the size being a width or a height; or
- is based on a size of a neighboring block relative to a size of the block, the size being a width or a height.

* * * * *